(12) United States Patent
Cui et al.

(10) Patent No.: US 12,170,844 B2
(45) Date of Patent: Dec. 17, 2024

(54) PHOTOGRAPHING METHOD AND ELECTRONIC DEVICE

(71) Applicant: Honor Device Co., Ltd., Shenzhen (CN)

(72) Inventors: Hantao Cui, Shenzhen (CN); Yang Yang, Shenzhen (CN); Shuai Feng, Shenzhen (CN); Jie Lin, Shenzhen (CN); Lingli Chang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 53 days.

(21) Appl. No.: 18/043,373

(22) PCT Filed: Mar. 18, 2022

(86) PCT No.: PCT/CN2022/081755
§ 371 (c)(1),
(2) Date: Feb. 28, 2023

(87) PCT Pub. No.: WO2022/262344
PCT Pub. Date: Dec. 22, 2022

(65) Prior Publication Data
US 2023/0247286 A1 Aug. 3, 2023

(30) Foreign Application Priority Data

Jun. 15, 2021 (CN) .......................... 202110662928.6
Sep. 15, 2021 (CN) .......................... 202111081692.3

(51) Int. Cl.
*H04N 23/667* (2023.01)
*G06T 7/70* (2017.01)
(Continued)

(52) U.S. Cl.
CPC ............. *H04N 23/667* (2023.01); *G06T 7/70* (2017.01); *H04N 23/632* (2023.01); *H04N 23/90* (2023.01)

(58) Field of Classification Search
CPC .... H04N 23/667; H04N 23/632; H04N 23/90; H04N 5/2226; H04N 23/58; H04N 23/60;
(Continued)

(56) References Cited

U.S. PATENT DOCUMENTS 10,200,623 B1 * 2/2019 Baldwin ................ H04N 23/63
10,825,146 B2   11/2020 Ouyang et al.
(Continued)

FOREIGN PATENT DOCUMENTS

CN    105100559 A    11/2015
CN    107295256 A    10/2017
(Continued)

OTHER PUBLICATIONS

Yuan, W., et al., "Study on contactless palmprint image sampling equipment", Microcomputer and Application 2010, DOI:10.19358/j.issn.1674-7720.2010.01.006, 2010, 4 pages.

*Primary Examiner* — Chiawei Chen
(74) *Attorney, Agent, or Firm* — Conley Rose, P.C.

(57) ABSTRACT

A photographing method and an electronic device. The photographing method includes: receiving, by the electronic device, a first operation for triggering the electronic device to enter a large aperture mode; obtaining, by the electronic device, a distance value between the electronic device and a photographed target object in response to the first operation; enabling, by the electronic device in a case that a distance value does not exceed a first distance threshold, a first camera and a second camera to acquire the image of the target object; enabling, by the electronic device in a case that the distance value exceeds the first distance threshold, the
(Continued)

first camera and a third camera to acquire the image of the target object; and displaying, by the electronic device, a preview image including the target object.

20 Claims, 10 Drawing Sheets

(51) Int. Cl.
*H04N 23/63* (2023.01)
*H04N 23/90* (2023.01)

(58) Field of Classification Search
CPC .... H04N 23/633; H04N 23/951; H04N 23/45; H04N 23/50; H04N 23/57; G06T 7/70; G02B 7/282
See application file for complete search history.

(56) References Cited

U.S. PATENT DOCUMENTS

| | | | |
|---|---|---|---|
| 11,095,812 B2 | 8/2021 | Li et al. | |
| 11,184,553 B1* | 11/2021 | Liu | H04N 23/84 |
| 11,877,064 B1* | 1/2024 | Douglas | G02B 30/22 |
| 2015/0319417 A1 | 11/2015 | Park et al. | |
| 2015/0334309 A1 | 11/2015 | Peng et al. | |
| 2018/0227478 A1 | 8/2018 | Li | |
| 2018/0288308 A1* | 10/2018 | Furumochi | H04N 23/72 |
| 2019/0166294 A1 | 5/2019 | Ouyang et al. | |
| 2019/0222738 A1* | 7/2019 | Galor Gluskin | H04N 23/631 |
| 2019/0297275 A1* | 9/2019 | Lee | H04N 5/265 |
| 2020/0137302 A1 | 4/2020 | Li et al. | |
| 2020/0265603 A1 | 8/2020 | Yim et al. | |
| 2021/0067749 A1 | 3/2021 | Yadav et al. | |
| 2022/0247937 A1* | 8/2022 | Wada | H04N 23/959 |
| 2022/0270222 A1* | 8/2022 | Kashiwagi | G06T 5/50 |
| 2022/0300757 A1* | 9/2022 | Tsuruyama | G06V 20/56 |
| 2022/0301180 A1 | 9/2022 | Wang et al. | |
| 2022/0417416 A1 | 12/2022 | Li et al. | |
| 2023/0091780 A1* | 3/2023 | Jung | H04N 5/2226 348/239 |
| 2024/0185441 A1* | 6/2024 | Li | G06T 5/70 |

FOREIGN PATENT DOCUMENTS

| | | |
|---|---|---|
| CN | 107948520 A | 4/2018 |
| CN | 107977940 A | 5/2018 |
| CN | 109120818 A | 1/2019 |
| CN | 109600555 A | 4/2019 |
| CN | 109614909 A | 4/2019 |
| CN | 109993785 A | 7/2019 |
| CN | 110677621 A | 1/2020 |
| CN | 110691193 A | 1/2020 |
| CN | 111031278 A | 4/2020 |
| CN | 111064895 A | 4/2020 |
| CN | 111183632 A | 5/2020 |
| CN | 111274959 A | 6/2020 |
| CN | 113194242 A | 7/2021 |
| CN | 113747028 A | 12/2021 |
| KR | 101165810 B1 | 7/2012 |
| WO | 2021031819 A1 | 2/2021 |

* cited by examiner (a)

(b)

PHOTOGRAPHING METHOD AND ELECTRONIC DEVICE

CROSS-REFERENCE TO RELATED APPLICATIONS

This application is a U.S. National Stage of International Application No. PCT/CN2022/081755 filed on Mar. 18, 2022, which claims priority to Chinese Patent Application Ser. No. 20/211,0662928.6, filed with the China National Intellectual Property Administration on Jun. 15, 2021 and Chinese Patent Application No. 202111081692.3, filed with the China National Intellectual Property Administration on Sep. 15, 2021, all of which are incorporated herein by reference in their entireties.

TECHNICAL FIELD

Embodiments of this application relate to the field of electronic technologies, and in particular, to a photographing method and an electronic device.

BACKGROUND

With the development of electronic technology, more and more cameras are integrated on an electronic device, and a plurality of cameras are used for meeting requirements of users in various photographing scenes. For example, an electronic device integrated with a plurality of cameras has a large aperture background blurring effect, zoom effect, and the like when photographing.

When the electronic device captures an image, if a background on a displayed image is overly cluttered and a user intends to highlight a subject in the image, a large aperture background blurring mode may be used in this case. In this way, the electronic device may blur the background and highlight the subject (focused object) in the image when capturing the image, so that clarity of the subject in the image is high and the background is blurred. For example, when a portrait is photographed, the portrait is displayed clearly and a background thereof is blurred, to achieve the large aperture background blurring effect.

SUMMARY

This application provides a photographing method and an electronic device, through which a captured image with a large aperture background blurred may be provided, and clarity of an object at a focus and a blurring effect of a background part may be improved.

To achieve the foregoing technical objective, this application adopts the following technical solutions.

According to a first aspect, this application provides a photographing method, and the method is applicable to an electronic device. The electronic device may include at least a first camera, a second camera, and a third camera. When the electronic device implements the method, the method may include: receiving, by the electronic device, a first operation, where the first operation is used for triggering the electronic device to enter a large aperture mode. It may be understood that the large aperture mode is a photographing mode, and the first operation may trigger the electronic device to capture an image or a video in the large aperture mode. When the electronic device enters the large aperture mode for photographing, the electronic device may first obtain a distance value between the electronic device and a photographed target object. If the distance value does not exceed a first distance value, the electronic device enables the first camera and the second camera to acquire an image of the target object, so that the electronic device may display a preview image including the target object. If the distance value exceeds the first distance value, the electronic device may enable the first camera and the third camera to acquire the image of the target object, so that the electronic device may display the preview image including the target object. It may be understood that the preview image is a preview image corresponding to the large aperture mode.

The electronic device enables different cameras based on the distance value between the electronic device and the photographed target object. It may be understood that, when the electronic device enables different cameras, a display effect of a preview image displayed by the electronic device is different. An image in the large aperture mode includes a clear display part and a blurred display part. The electronic device generates the image in the large aperture mode, and the electronic device generates the preview image including the target object based on an image acquired by two cameras. Parallax of the two cameras is different. In some photographing scenes, it may be difficult for the captured image to produce a depth of field, affecting a display effect of the image in the large aperture mode. For example, if a distance between the electronic device and the target object does not exceed a preset distance, to photograph a scene at a close range, the first camera and the second camera are enabled, and the electronic device may calculate the depth of field, so that a depth of field in a large aperture image displayed by the electronic device is obvious, and a display effect of the clear display part and the blurred display part is better.

With reference to the first aspect, in a possible implementation, before receiving the first operation, the electronic device may further perform the following operations; enabling, by the electronic device, the first camera to acquire the image of the target object.

That the electronic device obtains a distance value between the electronic device and a photographed target object specifically includes: obtaining, by the electronic device, an autofocus code (AF code) of the first camera, where the autofocus code indicates a distance value between the first camera and the target object. Based on autofocus of the first camera, the electronic device may use the autofocus code as a distance value between the electronic device and the target object.

It may be understood that the electronic device may obtain the distance value between the electronic device and the target object based on the autofocus code of the first camera. Therefore, the electronic device may use the autofocus code as the distance value between the electronic device and the target object. Specifically, after the electronic device obtains the autofocus code of the first camera, the electronic device may obtain the distance value between the electronic device and the target object by using a preset focus algorithm.

With reference to the first aspect, in another possible implementation, the electronic device may further include a distance sensor. That the electronic device obtains a distance value between the electronic device and a photographed target object specifically includes: enabling, by the electronic device, the distance sensor to determine a distance value between the electronic device and the target object.

When the distance sensor is enabled, the electronic device may directly obtain the distance value between the electronic device and the target object based on data fed back by the distance sensor.

Specifically, when the electronic device obtains the distance value through a first camera autofocus coding method, the electronic device may enable the first camera to obtain the distance value. When the electronic device obtains the distance value by using the distance sensor, the electronic device needs to control the distance sensor to determine the target object, so that the distance sensor may accurately feedback the distance value between the electronic device and the target object.

With reference to the first aspect, in another possible implementation, when the electronic device displays the preview image including the target object, a zoom ratio of the electronic device is a first ratio. The first ratio may be a preset ratio, such as 1×. When displaying an image including the target object, the electronic device may specifically include: outputting, by the electronic device, a raw pixel image through binning to generate the image of the target object and display the image including the target object.

With reference to the first aspect, in another possible implementation, when the electronic device displays the preview image including the target object, a zoom ratio of the electronic device is a first ratio. The first ratio may be the preset ratio, such as 1×. That after the electronic device enables the first camera and the second camera to acquire the image of the target object in a case that the distance value does not exceed the first distance value, the electronic device displays the image including the target object may specifically include: outputting, by the electronic device, a raw pixel image through binning to generate the image of the target object and display the image including the target object.

The zoom ratio of the electronic device is the first ratio, and the electronic device may output the raw pixel image through the binning, so that the electronic device generates the image including the target object based on the raw pixel image. The first ratio is the preset ratio, and the binning is a method through which the electronic device performs a simulated merging operation on pixel information in a pixel image to output the image including the target object.

With reference to the first aspect, in another possible implementation, after the electronic device displays the image including the target object, the method may further include: receiving, by the electronic device, a second operation, where the second operation instructs the electronic device to adjust the zoom ratio to a second ratio, and the second ratio is greater than the first ratio; and outputting, by the electronic device, a raw pixel image through remosaic in response to the second operation to generate an image of the target object and display the image including the target object.

It may be understood that the second ratio is greater than the first ratio. That is, when the electronic device displays the preview image in the large aperture mode, a zoom operation inputted by a user is received, and the electronic device displays a large aperture mode image in the second ratio. In the remosaic, the electronic device may rearrange pixels in the pixel image, to improve clarity of a zoomed image. Therefore, the electronic device outputs the raw pixel image through the remosaic in a mode of a high ratio (that is, enlarging a ratio of the image) and a large aperture, which may effectively improve clarity of an image displayed by the electronic device and make a display effect of the preview image better.

With reference to the first aspect, in another possible implementation, the first camera, the second camera, and the third camera are arranged on a first surface of the electronic device, for example, the three cameras are arranged on the back of a mobile phone. A distance value between the first camera and the second camera is less than a distance value between the first camera and the third camera.

With reference to the first aspect, in another possible implementation, the first camera, the second camera, and the third camera are back cameras arranged on the electronic device. The first camera may be a back primary camera, the second camera may be a wide-angle camera, and the third camera may be a telephoto or depth camera.

With reference to the first aspect, in another possible implementation, the first camera, the second camera, and the third camera are arranged on the first surface of the electronic device. When the electronic device obtains an image, a camera arranged on the first surface is enabled. The electronic device may further include a fourth camera and a fifth camera. The fourth camera and the fifth camera may be arranged on a second surface of the electronic device, such as the front of the electronic device.

After receiving the first operation, the electronic device may further perform the following operations: receiving, by the electronic device, a third operation, where the third operation is used for triggering the electronic device to enable the cameras on the second surface; enabling, by the electronic device, the fourth camera and the fifth camera in response to the third operation to acquire the image of the target object, where the fourth camera serves as a primary camera, the fifth camera serves as a secondary camera, the primary camera is configured to focus on the target object, and the secondary camera is configured to calculate a depth of field; displaying, by the electronic device, an image including the target object, where the image is a preview image corresponding to the large aperture mode, and a zoom ratio corresponding to the preview image is a first ratio; receiving, by the electronic device, a second operation, where the second operation instructs the electronic device to adjust the zoom ratio to a second ratio, and the second ratio is greater than the first ratio; adjusting, by the electronic device, the fifth camera as a primary camera, and the sixth camera as a secondary camera in response to the second operation; and displaying, by the electronic device, an image including the target object based on these operations, where the image is a preview image corresponding to the large aperture mode, and a zoom ratio corresponding to the preview image is a second ratio.

The fourth camera and the fifth camera are arranged on another surface (that is, the second surface) of the electronic device, and the electronic device enables the fourth camera and the fifth camera w % ben receiving an operation of switching a camera. After the camera is switched, the fourth camera is used as the primary camera, the fifth camera is used as the secondary camera, and the electronic device outputs an image through the binning. In this way, when the electronic device receives a zoom operation, the electronic device switches the first ratio to the second ratio, and the electronic device switches the primary camera and the secondary camera, and adjusts to output the image through the remosaic, to improve a display effect of a preview image in the large aperture mode displayed by electronic device and improve clarity of zoom display.

With reference to the first aspect, in another possible implementation, in response to the second operation, the electronic device enables the fourth camera and the fifth camera to acquire the image of the target object. The foregoing method may further include: outputting, by the electronic device, a raw pixel image through binning to generate the image of the target object and display the image including the target object.

The electronic device displays the image including the target object, the image is the preview image corresponding to the large aperture mode, and the zoom ratio corresponding to the preview image is the second ratio. The method may further include: outputting, by the electronic device, a raw pixel image through remosaic to generate the image of the target object and display the image of the target object.

With reference to the first aspect, in another possible implementation, if the distance value does not exceed the first distance value, the electronic device enables the first camera and the second camera to acquire the image of the target object. After the electronic device displays the image including the target object, the method further includes: obtaining, by the electronic device, a current distance value between the electronic device and the target object; and enabling, by the electronic device in a case that the current distance value exceeds a second distance value, the first camera and the third camera to acquire the image of the target object, where the second distance value is greater than the first distance value.

With reference to the first aspect, in another possible implementation, if the distance value exceeds the first distance value, the electronic device enables the first camera and the third camera to acquire the image of the target object. After the electronic device displays the image including the target object, the electronic device may further perform the following operations: obtaining, by the electronic device, a current distance value between the electronic device and the target object again; and enabling, by the electronic device in a case that the current distance value does not exceed a third distance value, the first camera and the second camera to acquire the image of the target object, where the third distance value is less than the first distance value.

With reference to the first aspect, in another possible implementation, the preview image corresponding to the large aperture mode includes a blurred display part and a clear display part. The electronic device enables the first camera and the second camera to acquire the image of the target object in a case that the distance value does not exceed the first distance value. The first camera serves as a primary camera and the second camera serves as a secondary camera.

When the electronic device displays the image including the target object, the electronic device specifically performs the following operations: acquiring, by the primary camera, a first image, and acquiring, by the secondary camera, a second image; determining, by the electronic device, a target object based on the first image, and determining the target object as the clear display part; calculating, by the electronic device, a depth of field based on the second image, and determining the blurred display part; and generating, by the electronic device, the preview image corresponding to the large aperture mode based on the first image and the second image, and displaying the preview image.

With reference to the first aspect, in another possible implementation, the preview image corresponding to the large aperture mode includes a blurred display part and a clear display part. The electronic device enables the first camera and the third camera to acquire the image of the target object in a case that the distance value exceeds the first distance value. The first camera serves as a primary camera and the third camera serves as a secondary camera.

The electronic device displays the image including the target object, and the electronic device specifically performs the following operations: acquiring, by the primary camera, a first image, and acquiring, by the secondary camera, a second image; outputting, by the primary camera, a raw pixel image through binning, and obtaining the first image based on the raw pixel image; determining, by the electronic device, a target object based on the raw pixel image, to determine the target object as the clear display part; calculating, by the electronic device, a depth of field based on the second image, and determining the blurred display part; and generating, by the electronic device, the preview image corresponding to the large aperture mode based on the first image and the second image, and displaying the preview image.

With reference to the first aspect, in another possible implementation, the preview image corresponding to the large aperture mode includes a blurred display part and a clear display part. The enabling, by the electronic device, the fourth camera and the fifth camera in response to the third operation to acquire the image of the target object specifically includes: acquiring, by the primary camera, a first image, and acquiring, by the secondary camera, a second image; outputting, by the primary camera, a raw pixel image through binning, and obtaining the first image based on the raw pixel image; determining, by the electronic device, a target object based on the raw pixel image, to determine the target object as the clear display part; calculating, by the electronic device, a depth of field based on the second image, and determining the blurred display part; and generating, by the electronic device, the image of the target object based on the first image and the second image. The adjusting, by the electronic device, the fifth camera as a primary camera, and the sixth camera as a secondary camera in response to the second operation includes: acquiring, by the primary camera, a first image, and acquiring, by the secondary camera, a second image; outputting, by the primary camera, the raw pixel image through remosaic, and cropping the raw pixel image to obtain the first image; determining, by the electronic device, a target object based on the raw pixel image, to determine the target object as the clear display part; calculating, by the electronic device, a depth of field based on the second image, and determining the blurred display part; and generating, by the electronic device, the image of the target object based on the first image and the second image.

With reference to the first aspect, in another possible implementation, the binning includes: obtaining, by the electronic device, a pixel image of the target object, and performing a simulated merging operation on pixel information in the pixel image, to output the image including the target object; and the remosaic includes: obtaining, by the electronic device, the pixel image of the target object, and rearranging pixels in the pixel image, to output the image including the target object.

With reference to the first aspect, in another possible implementation, that the electronic device generates an image of the target object through remosaic and displays the image including the target object includes: outputting, by the electronic device, a raw image through the remosaic; cropping, by the electronic device, the raw image to generate the image of the target object; and displaying, by the electronic device, the image including the target object.

According to a second aspect, the embodiments of this application provide an electronic device. The electronic device includes: a first camera, a second camera, and a third camera, configured to acquire an image; a display screen, configured to display an interface; one or more processors; a memory; and one or more computer programs, where the one or more computer programs are stored in the memory. When the memory executes the computer programs, the electronic device may perform the following steps, receiving, by the electronic device, a first operation, where the first operation is used for triggering the electronic device to enter a large aperture mode. It may be understood that the large aperture mode is a photographing mode, and the first operation may trigger the electronic device to capture an image or a video in the large aperture mode. When the electronic device enters the large aperture mode for photographing, the electronic device may first obtain a distance value between the electronic device and a photographed target object. If the distance value does not exceed a first distance value, the electronic device enables the first camera and the second camera to acquire an image of the target object, so that the electronic device may display a preview image including the target object. If the distance value exceeds the first distance value, the electronic device may enable the first camera and the third camera to acquire the image of the target object, so that the electronic device may display the preview image including the target object. It may be understood that the preview image is a preview image corresponding to the large aperture mode.

With reference to the second aspect, in a possible implementation, the electronic device may further perform the following operations: enabling, by the electronic device, the first camera to acquire the image of the target object.

That the electronic device obtains a distance value between the electronic device and a photographed target object specifically includes: obtaining, by the electronic device, an autofocus code (AF code) of the first camera, where the autofocus code indicates a distance value between the first camera and the target object. Based on autofocus of the first camera, the electronic device may use the autofocus code as a distance value between the electronic device and the target object.

With reference to the second aspect, in another possible implementation, the electronic device may further include a distance sensor. That the electronic device obtains a distance value between the electronic device and a photographed target object specifically includes: enabling, by the electronic device, the distance sensor to determine a distance value between the electronic device and the target object.

With reference to the second aspect, in another possible implementation, when displaying an image including the target object, the electronic device may specifically include: outputting, by the electronic device, a raw pixel image through binning to generate the image of the target object and display the image including the target object.

With reference to the second aspect, in another possible implementation, that after the electronic device enables the first camera and the second camera to acquire the image of the target object in a case that the distance value does not exceed the first distance value, the electronic device displays the image including the target object may specifically include: outputting, by the electronic device, a raw pixel image through binning to generate the image of the target object and display the image including the target object.

With reference to the second aspect, in another possible implementation, after the electronic device displays the image including the target object, the electronic device may further perform the following operations: receiving, by the electronic device, a second operation, where the second operation instructs the electronic device to adjust the zoom ratio to a second ratio, and the second ratio is greater than the first ratio; and outputting, by the electronic device, a raw pixel image through remosaic in response to the second operation to generate an image of the target object and display the image including the target object.

With reference to the second aspect, in another possible implementation, the first camera, the second camera, and the third camera are arranged on a first surface of the electronic device, for example, the three cameras are arranged on the back of a mobile phone. A distance value between the first camera and the second camera is less than a distance value between the first camera and the third camera.

With reference to the second aspect, in another possible implementation, the first camera, the second camera, and the third camera are back cameras arranged on the electronic device. The first camera may be a back primary camera, the second camera may be a wide-angle camera, and the third camera may be a telephoto or depth camera.

With reference to the second aspect, in another possible implementation, the first camera, the second camera, and the third camera are arranged on the first surface of the electronic device. When the electronic device obtains an image, a camera arranged on the first surface is enabled. The electronic device may further include a fourth camera and a fifth camera. The fourth camera and the fifth camera may be arranged on a second surface of the electronic device, such as the front of the electronic device.

After receiving the first operation, the electronic device may further perform the following operations: receiving, by the electronic device, a third operation, where the third operation is used for triggering the electronic device to enable the cameras on the second surface; enabling, by the electronic device, the fourth camera and the fifth camera in response to the third operation to acquire the image of the target object, where the fourth camera serves as a primary camera, the fifth camera serves as a secondary camera, the primary camera is configured to focus on the target object, and the secondary camera is configured to calculate a depth of field; displaying, by the electronic device, an image including the target object, where the image is a preview image corresponding to the large aperture mode, and a zoom ratio corresponding to the preview image is a first ratio; receiving, by the electronic device, a second operation, where the second operation instructs the electronic device to adjust the zoom ratio to a second ratio, and the second ratio is greater than the first ratio; adjusting, by the electronic device, the fifth camera as a primary camera, and the sixth camera as a secondary camera in response to the second operation; and displaying, by the electronic device, an image including the target object based on these operations, where the image is a preview image corresponding to the large aperture mode, and a zoom ratio corresponding to the preview image is a second ratio.

With reference to the second aspect, in another possible implementation, if the distance value does not exceed the first distance value, the electronic device enables the first camera and the second camera to acquire the image of the target object. After the electronic device displays the image including the target object, the method further includes: obtaining, by the electronic device, a current distance value between the electronic device and the target object; and enabling, by the electronic device in a case that the current distance value exceeds a second distance value, the first camera and the third camera to acquire the image of the target object, where the second distance value is greater than the first distance value.

With reference to the second aspect, in another possible implementation, if the distance value exceeds the first distance value, the electronic device enables the first camera and the third camera to acquire the image of the target object. After the electronic device displays the image including the target object, the electronic device may further perform the following operations: obtaining, by the electronic device, a current distance value between the electronic device and the target object again; and enabling, by the electronic device in a case that the current distance value does not exceed a third distance value, the first camera and the second camera to acquire the image of the target object, where the third distance value is less than the first distance value.

With reference to the second aspect, in another possible implementation, the preview image corresponding to the large aperture mode includes a blurred display part and a clear display part. The electronic device enables the first camera and the second camera to acquire the image of the target object in a case that the distance value does not exceed the first distance value. The first camera serves as a primary camera and the second camera serves as a secondary camera.

When the electronic device displays the image including the target object, the electronic device specifically performs the following operations, acquiring, by the primary camera, a first image, and acquiring, by the secondary camera, a second image; determining, by the electronic device, a target object based on the first image, and determining the target object as the clear display part; calculating, by the electronic device, a depth of field based on the second image, and determining the blurred display part; and generating, by the electronic device, the preview image corresponding to the large aperture mode based on the first image and the second image, and displaying the preview image.

With reference to the first aspect, in another possible implementation, the preview image corresponding to the large aperture mode includes a blurred display part and a clear display part. The electronic device enables the first camera and the third camera to acquire the image of the target object in a case that the distance value exceeds the first distance value. The first camera serves as a primary camera and the third camera serves as a secondary camera.

The electronic device displays the image including the target object, and the electronic device specifically performs the following operations: acquiring, by the primary camera, a first image, and acquiring, by the secondary camera, a second image; outputting, by the primary camera, a raw pixel image through binning, and obtaining the first image based on the raw pixel image; determining, by the electronic device, a target object based on the raw pixel image, to determine the target object as the clear display part; calculating, by the electronic device, a depth of field based on the second image, and determining the blurred display part; and generating, by the electronic device, the preview image corresponding to the large aperture mode based on the first image and the second image, and displaying the preview image.

With reference to the first aspect, in another possible implementation, the preview image corresponding to the large aperture mode includes a blurred display part and a clear display part. The enabling, by the electronic device, the fourth camera and the fifth camera in response to the third operation to acquire the image of the target object specifically includes: acquiring, by the primary camera, a first image, and acquiring, by the secondary camera, a second image; outputting, by the primary camera, a raw pixel image through binning, and obtaining the first image based on the raw pixel image; determining, by the electronic device, a target object based on the raw pixel image, to determine the target object as the clear display part; calculating, by the electronic device, a depth of field based on the second image, and determining the blurred display part; and generating, by the electronic device, the image of the target object based on the first image and the second image. The adjusting, by the electronic device, the fifth camera as a primary camera, and the sixth camera as a secondary camera in response to the second operation includes: acquiring, by the primary camera, a first image, and acquiring, by the secondary camera, a second image; outputting, by the primary camera, the raw pixel image through remosaic, and cropping the raw pixel image to obtain the first image; determining, by the electronic device, a target object based on the raw pixel image, to determine the target object as the clear display part; calculating, by the electronic device, a depth of field based on the second image, and determining the blurred display part; and generating, by the electronic device, the image of the target object based on the first image and the second image.

With reference to the second aspect, in another possible implementation, the binning includes: obtaining, by the electronic device, a pixel image of the target object, and performing a simulated merging operation on pixel information in the pixel image, to output the image including the target object; and the remosaic includes: obtaining, by the electronic device, the pixel image of the target object, and rearranging pixels in the pixel image, to output the image including the target object.

With reference to the second aspect, in another possible implementation, that the electronic device generates an image of the target object through remosaic and displays the image including the target object includes: outputting, by the electronic device, a raw image through the remosaic; cropping, by the electronic device, the raw image to generate the image of the target object; and displaying, by the electronic device, the image including the target object.

According to a third aspect, this application further provides an electronic device. The electronic device includes: a camera, configured to acquire an image; a display screen, configured to display an interface; one or more processors; a memory; and one or more computer programs, where the one or more computer programs are stored in the memory, the one or more computer programs include instructions, and when the instructions are executed by the electronic device, the electronic device is caused to perform the photographing method according to the first aspect and any possible design method thereof.

According to a fourth aspect, this application further provides a computer-readable storage medium. The computer-readable storage medium includes: a computer instruction, where when the computer instruction is run on the computer, a computer is caused to perform the photographing method according to the first aspect and any possible design method thereof.

According to a fifth aspect, the embodiments of this application provide a computer program product, and when the computer program product is run on a computer, the computer is caused to perform a method performed by the electronic device in the first aspect and any possible design thereof.

According to a sixth aspect, the embodiments of this application provide a chip system, and the chip system is applied to an electronic device. The chip system includes one or more interface circuits and one or more processors. The interface circuit and the processor are interconnected through a line. The interface circuit is configured to receive a signal from a memory of the electronic device and transmit the signal to the processor, and the signal includes a computer instruction stored in the memory. When the processor executes the computer instruction, the electronic device is caused to perform the method according to the first aspect and any possible design thereof.

It may be understood that beneficial effects that can be achieved by the electronic device of the second aspect, the electronic device of the third aspect, the computer-readable storage medium of the fourth aspect, the computer program product of the fifth aspect, and the chip system of the sixth aspect provided in this application may be referred to beneficial effects in the first aspect and any possible design thereof, and this is not repeated again herein.

DESCRIPTION OF EMBODIMENTS

The terms "first" and "second" mentioned below are merely intended for a purpose of description, and shall not be understood as an indication or implication of relative importance or implicit indication of the quantity of indicated technical features. Therefore, a feature defined by "first" or "second" can explicitly or implicitly include one or more features. In the descriptions of the embodiments, unless otherwise stated, "a plurality of" means two or more.

For convenience of understanding of solutions provided in the embodiments of this application, some terms related in the embodiments of this application are described below:

Binning (Binning): In a process that an electronic device captures an image, light reflected by a target object is acquired by a camera, so that the reflected light is transmitted to an image sensor. The image sensor includes a plurality of photosensitive elements, a charge acquired by each of the photosensitive elements is a pixel, and each of the photosensitive elements performs a simulated binning (Binning) operation on pixel information. Specifically, n×n pixels may be merged into one pixel through the binning. For example, adjacent 3×3 pixels may be merged into one pixel through the binning, that is, colors of the adjacent 3×3 pixels are displayed in a form of one pixel.

For ease of understanding, the binning may be referred to as a "first pixel arrangement method", a "first pixel combination method", a "first image readout mode", or the like.

Figure 1A:
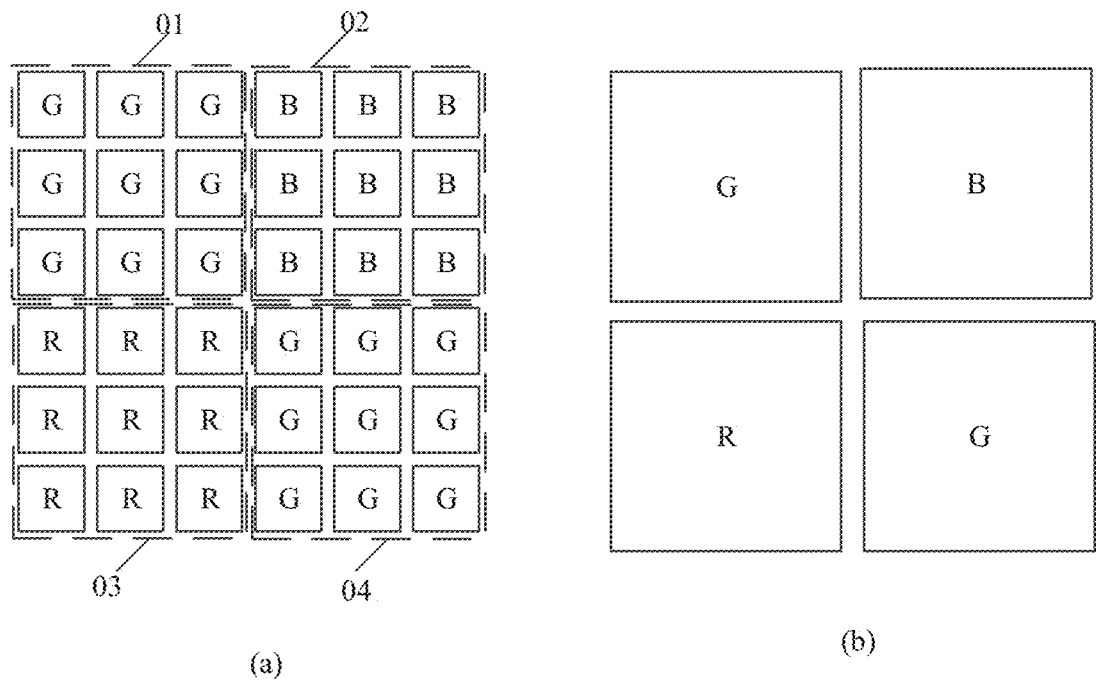
FIG. 1A is a schematic diagram of a pixel signal merging method according to an embodiment of this application.

Exemplarily, as shown in FIG. 1A, FIG. 1A is a schematic diagram of a process in which an electronic device reads out an image through binning after obtaining the image. FIG. 1A(a) is a schematic diagram of 6×6 pixels, and adjacent 3×3 pixels are merged into one pixel. FIG. 1A(b) is a schematic diagram of pixels read out through the binning. For example, through the binning, 3×3 pixels in a 01 region in FIG. 1A(a) are formed into a pixel G in FIG. 1A(b); 3×3 pixels in a 02 region in FIG. 1A(a) are formed into a pixel B in FIG. 1A(b); 3×3 pixels in a 03 region in FIG. 1A(a) are formed into a pixel R in FIG. 1A(b); and 3×3 pixels in a 04 region in FIG. 1A(a) are formed into a pixel G in FIG. 1A(b).

For example, an image is outputted in a bayer (Bayer) format. The image in the bayer format refers to an image only including red, blue, and green (that is, three primary colors). For example, a pixel A formed by 3×3 pixels in the 01 region is red, a pixel B formed by 3×3 pixels in the 02 region is green, a pixel C formed by 3-3 pixels in the 03 region is green, and a pixel D formed by 3×3 pixels in the 04 region is blue.

Remosaic (Remosaic): When an image is read out through the remosaic, pixels are rearranged into an image in the bayer format. For example, if one pixel in an image is formed by n×n pixels, one pixel in the image may be rearranged into n×n pixels through the remosaic. For ease of understanding, the remosaic may be referred to as a "second pixel arrangement method", a "second pixel combination method", a "second image readout mode", or the like.

Figure 1B:
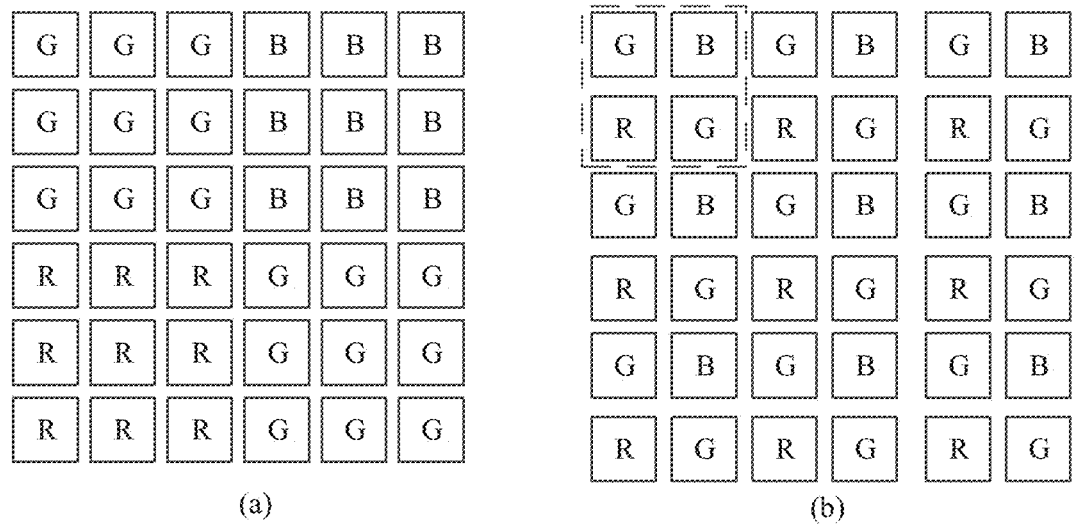
FIG. 1B is a schematic diagram of another pixel signal merging method according to an embodiment of this application.

Exemplarily, FIG. 1B(a) is a schematic diagram of pixels, and each of the pixels is merged by adjacent 3×3 pixels. FIG. 1B(b) is a schematic diagram of an image in the bayer format read out through the remosaic. Specifically, in FIG. 1B(a), a pixel A is red, a pixel B and a pixel C are green, and a pixel D is blue. Each pixel in FIG. 1B(a) is divided into 3×3 pixels and is respectively rearranged. That is, an image read out through the remosaic is the image in the bayer format shown in FIG. 1B(b).

Bokeh (bokeh): An image includes a clear part and a blurred part (or a fuzzy part). Then, imaging of the blurred part is called the bokeh. Specifically, the blurred part of the image includes foreground blurring and background blurring.

Focus: A lens in an electronic device is generally composed of at least one lens, and the lens includes a convex lens and a concave lens. For example, the lens is the convex lens. After a beam reflected (or emitted) by a target object is projected onto the convex lens, the beam gradually converges to a point, and the point is the focus. When the beam converges to a point, as the beam continues to propagate, the beam diverges again.

Circle of confusion (circle of confusion): For example, the lens is the convex lens. If an image plane (or a projection plane) exactly includes a focus of the convex lens, in this case, an image of a beam reflected by the target object on the image plane is a clear point. If the image plane does not include a focus position, regardless of whether the image plane is located between the focus and the convex lens, or the image plane is located behind the focus, the image of the beam reflected by the target object on the image plane is a circular region instead of a point, and the circular region is the circle of confusion. The circle of confusion may further be called: a diffuse circle, a diffuse ring, an astigmatism circle, a blur circle, a scattering disc, or the like.

Figure 2:
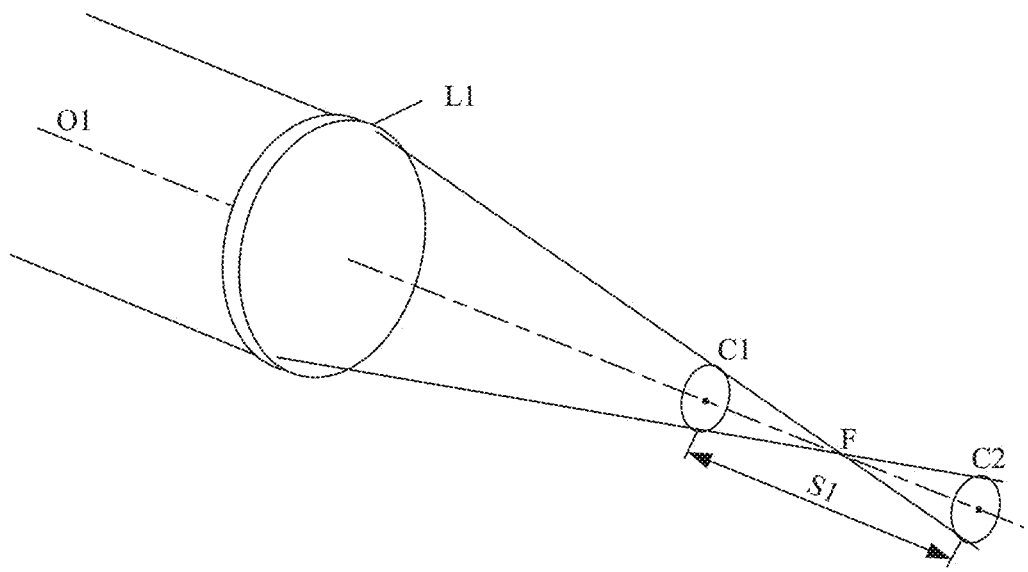
FIG. 2 is a schematic diagram of imaging through a lens according to an embodiment of this application.

FIG. 2 is a schematic diagram of imaging through a lens. O1 is an optical axis of a lens L1, and a distance between the lens L1 and a focus F is a focal length. In an imaging process, an electronic device may display a preview image. The preview image includes a clear region of the circle of confusion, an image in the circle of confusion is perceived to be clear through human eyes, and the circle of confusion in this case is called an allowable circle of confusion. There is a circle of confusion front C1 (that is, a maximum allowable circle of confusion between the lens L1 and the focus F) between the focus F and the lens L1, and there is a circle of confusion back C2 (that is, a maximum allowable circle of confusion located on a side away from the lens L1 and the focus F) behind the focus F. A distance between a center point of the circle of confusion front C1 and a center point of the circle of confusion back C2 becomes a depth of focus, that is, a distance shown in S1 in FIG. 2.

Depth of field: In an imaging process of the electronic device, light reflected by the target object propagates to an imaging plane, so that the imaging plane acquires the light reflected by the target object. When the imaging plane includes a focus, the electronic device may obtain a clear image. It may be understood that the target object is located in a certain region before or after a focus point, and the electronic device may still obtain a clear image of the target object. This region is called a depth of field. The lens is used as a near point, a clear imaging range between the focus and the near point is called a front depth of field, and an imaging range between the focus and a farthest clear imaging point is called a far depth of field.

Figure 3A:
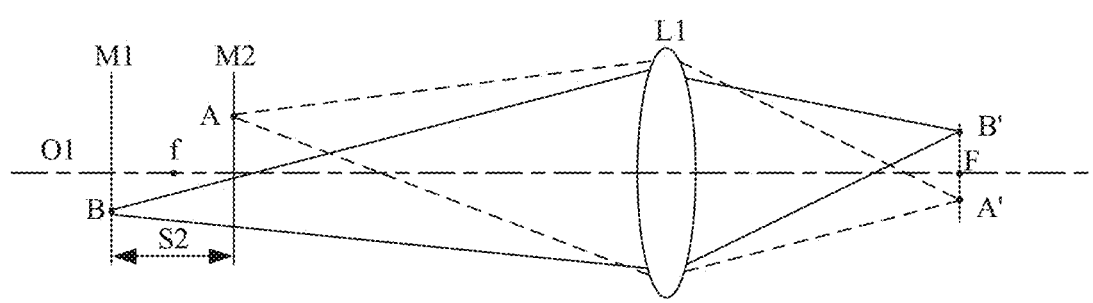
FIG. 3A is a schematic diagram of photographing a target object by an electronic device according to an embodiment of this application.

Exemplarily, FIG. 3A is a schematic diagram of photographing a target object by an electronic device. O1 is an optical axis of a lens L1. It is assumed that an imaging plane is located at a position of a focus F of the lens L1, f represents a focus point of the lens L1, and a distance indicated by S2 is a depth of field. That is, when the target object is located in a range between M1 and M2, light reflected by the target object may be reflected to the imaging plane through the lens L1, so that the electronic device obtains a clear image of the target object. As shown in FIG. 2, there is a near point A and a far point B. and light that may be reflected by both the near point A and the far point B may be projected to the imaging plane through the lens L1, that is, in FIG. 2, A' is an imaging point of the near point A and B' is an imaging point of the far point B.

Aperture: The aperture is an apparatus configured to control a beam that passes through a lens, and is generally arranged in the lens. Exemplarily, the aperture may be composed of several roll-leaf metal sheets. These metal sheets may form a hole whose size is adjustable. When the electronic device adjusts an aperture size, the size of the hole is adjusted by rotating the metal sheet, to adjust a size of a photographing aperture.

The photographing method provided in the embodiments of this application is applicable to an electronic device including a plurality of cameras, and a plurality of photographing modes may be set in the electronic device, such as a portrait mode, a large aperture mode, a professional mode, a night photographing mode, and the like. When a user captures an image through the electronic device, to highlight a subject in the captured image, the user may select a large aperture mode in the electronic device. When the electronic device generates an image in the large aperture mode, a depth of field in the captured image may be shallower, so that a subject (or a focused object) focused by a lens in the electronic device is clear, and a picture of another object (or a target object) in an off-focus range presented in the electronic device is blurred to highlight the focused subject. That is, when the electronic device captures an image in the large aperture mode, an obtained image has a clear photographing subject and a blurred background.

Figure 3B:
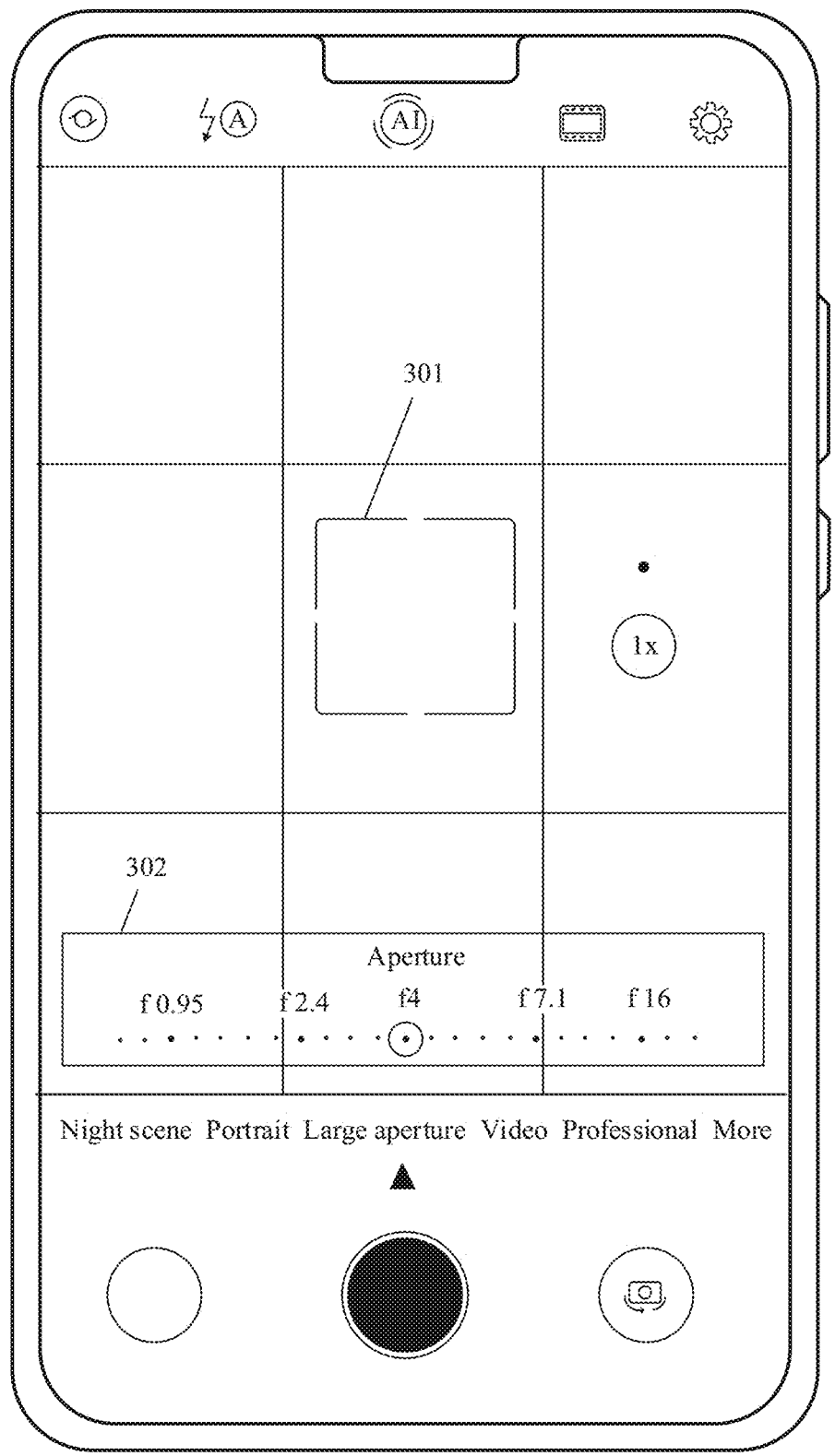
FIG. 3B is a schematic diagram of a photographing interface of an electronic device according to an embodiment of this application.

Exemplarily, when a mobile phone captures a target object in the large aperture mode, the mobile phone runs a camera application, and the mobile phone captures an image in the large aperture mode in response to a user's selection of a photographing mode. FIG. 3B is a schematic diagram of a photographing interface in a large aperture mode displayed by a mobile phone. As shown in FIG. 3B, 301 represents an aperture size, that is, a clear display part in a generated large aperture image. 302 represents an aperture size adjustment region and a current aperture size shown in FIG. 3B is f4. If a user wants to change the aperture size, the user may adjust a number or dot mark in a region 302 in a sliding manner. When the mobile phone receives adjustment of the aperture by the user, the aperture size shown by 301 in the photographing interface displayed by the mobile phone may be changed. As shown in FIG. 3B, an adjustment range of the aperture in the mobile phone is between f0.95 and f16, and the smaller an aperture value is, the larger the aperture is.

It should be noted that, when an electronic device including a plurality of cameras generates a captured image in a large aperture mode, the electronic device may generate the captured image by using a dual camera (that is, two cameras work at the same time) large aperture. One of the two cameras is a primary camera (or a primary camera, hereinafter referred to as the primary camera), and the other is a secondary camera (or a secondary camera, hereinafter referred to as the secondary camera). When the electronic device captures an image in the large aperture mode, the primary camera and the secondary camera are enabled and are in a working state. In this case, the electronic device may obtain images acquired by the primary camera and the secondary camera. Because the primary camera and the secondary camera are different cameras, focuses of the primary camera and the secondary camera are different, and fields of view (Field of View, FOV) of the images acquired by the primary camera and the secondary camera are also different.

In a specific image generation process, based on a first image acquired by the primary camera and a second image acquired by the secondary camera, the electronic device may determine an overlapping part between the first image and the second image through an image cropping algorithm. Further, the electronic device determines a target object based on focus of the primary camera, and then determines a clear display part on a displayed image. The electronic device calculates a depth of field based on the focus of the secondary camera, to determine a blurred part on the displayed image. The electronic device may perform blurring processing on a to-be-blurred part based on a blurring algorithm, so that a part on the displayed image has a blurring display effect. In this way, the electronic device forms a displayed image with a large aperture background blurred. In the displayed image, a focused target object is clear and a background is blurred.

The following describes implementations of the embodiments of this application with reference to the accompanying drawings.

Figure 4:
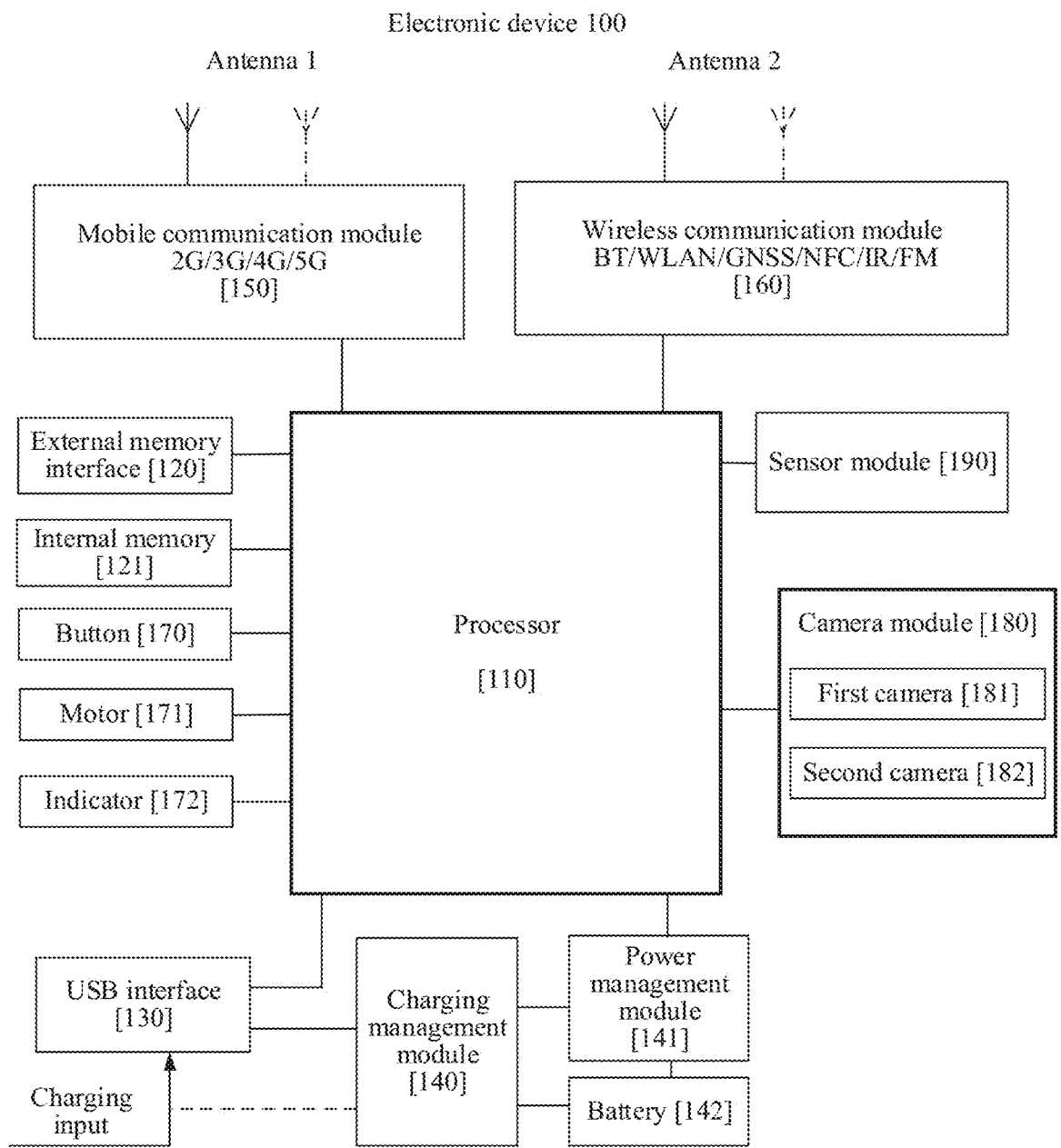
FIG. 4 is a schematic diagram of a hardware structure of an electronic device according to an embodiment of this application.

FIG. 4 is a schematic structural diagram of an electronic device according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, a button 170, a motor 171, an indicator 172, a display screen 173, a camera module 180, a sensor module 190, and the like. The sensor module 190 may include a pressure sensor, a gyro sensor, an acceleration sensor, a distance sensor, an optical proximity sensor, a temperature sensor, and a touch sensor, an ambient light sensor, and the like.

The camera module 180 may include 2 to N cameras, for example, the camera module 180 includes a first camera 181 and a second camera 182. The first camera 181 is a primary camera and the second camera 182 is a secondary camera. When the electronic device generates an image, the electronic device may invoke the first camera 181 and the second camera 182, and the electronic device may calculate a depth of field based on an image acquired by the second camera 182, and generate a preview image (or a captured image) based on an image acquired by the first camera 181.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a timing signal, and read an instruction and control execution of the instruction.

A memory may be further arranged in the processor 110, and is configured to store instructions and data. In some embodiments, the memory in the processor 110 is a cache memory. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in the embodiments of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or may be a wired charger. In some embodiments of wired charging, the charging management module 140 may receive charging input of a wired charger by using the USB interface 130. In some embodiments of wireless charging, the charging management module 140 may receive wireless charging input by using a wireless charging coil of the electronic device 100. The charging management module 140 may supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 173, a camera 193, the wireless communication module 160, and the like. The power management module 141 may be further configured to monitor parameters such as a battery capacity, a battery cycle count, and a battery state of health (electric leakage and impedance).

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applicable to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The AP outputs a sound signal through an audio device (which is not limited to the speaker 170A, the phone receiver 170B, and the like), or displays an image or a video through the display screen 173. In some embodiments, the modem processor may be an independent component.

The wireless communication module 160 may provide a solution for wireless communication including wireless local area networks (wireless local area networks, WLAN) (such as a Wi-Fi network), Bluetooth (Bluetooth, BT), and a global navigation satellite system (global navigation satellite system, GNSS), frequency modulation (frequency modulation, FM), NFC, an infrared (infrared, IR) technology, and the like applied to the electronic device 100. The wireless communication module 160 may be one or more devices integrating at least one communication processing module.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology.

The electronic device 100 implements a display function by using the GPU, the display screen 173, the application processor, and the like. The GPU is a microprocessor for image processing, and is connected to the display screen 173 and the application processor. The GPU is configured to perform mathematical and geometric calculation, and is configured to render graphics. The processor 110 may include one or more GPUs, and execute program instructions to generate or change display information.

The display screen 173 is configured to display an image, a video, and the like. The display screen 173 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device 100 may include one or N display screens 173. N is a positive integer greater than 1.

The electronic device 100 may implement a photographing function through the ISP, the camera module 180, the video codec, the GPU, the display screen 173, the application processor, and the like.

The ISP is mainly configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a photographing scene. In some embodiments, the ISP may be disposed in the camera 193.

The camera module 180 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 100 may include one or N cameras 193, and N is a positive integer greater than 1.

Exemplarily, the first camera 181 and the second camera 182 acquire raw images, and the camera module 180 performs image processing on the acquired raw images to obtain a first image and a second image. The first image is generated based on the raw image acquired by the first camera 181, and the second image is generated based on the raw image acquired by the second camera 182. The second camera 182 is used as a secondary camera, and the ISP may perform image processing on the second image and data fed back by the second camera 182 to calculate a depth of field under a current photographing scene. The first camera 182 is used as a primary camera, and the ISP may determine a blurred part on the first image based on the calculated depth of field. Further, the ISP may further determine a target object focused on by the primary camera based on an overlapping part between the first image and the second image. In this way, the ISP may process the first image based on a preset algorithm, so that a target object in the first image is more clearly imaged and a background part is more blurred. Based on this, the ISP may generate a display image by processing the first image and the second image, and transmits the display image to the display screen, so that the display screen displays the display image.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, MPEG 4, or the like.

The NPU is a neural-network (neural-network, NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

The external memory interface 120 may be configured to connect to an external storage card such as a micro SD card, to expand a storage capability of the electronic device 100.

The external storage card communicates with the processor 110 by using the external memory interface 120, to implement a data storage function, such as storing a file such as a music or a video in the external storage card.

The internal memory 121 may be configured to store computer executable program code, and the executable program code includes instructions. The processor 110 runs the instruction stored in the internal memory 121, to perform various function applications and data processing of the electronic device 100. The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

A key 170 includes a power key, a volume key, and the like. The key 170 may be a mechanical key, or a touch-type key. The electronic device 100 may receive a key input, and generate a key signal input related to user setting and function control of the electronic device 100.

The motor 171 may generate a vibration prompt. The motor 171 may be configured to provide a vibration prompt for an incoming call, and may be further configured to provide a touch vibration feedback. For example, touch operations performed on different applications (for example, photo taking and audio playing) may correspond to different vibration feedback effects.

The indicator 172 may be an indicator light, may be configured to indicate a charging state and a battery change, and may be further configured to indicate a message, a missed call, a notification, and the like.

It needs to be noted that, the electronic device in the embodiments of this application may be a mobile phone with a photographing function, an action camera (GoPro), a digital camera, a tablet computer, a desktop computer, a laptop computer, a handheld computer, a notebook computer, an in-vehicle device, an ultra-mobile personal computer (ultra-mobile personal computer, UMPC), a netbook, a cellular phone, a personal digital assistant (personal digital assistant, PDA), an augmented reality (augmented reality, AR)\virtual reality (virtual reality, VR) device, and the like. A specific form of the electronic device is not specially limited in the embodiments of this application.

An example in which an electronic device having a structure shown in FIG. 4 is a mobile phone is used for describing the photographing method provided in the embodiments of this application. A touch screen of the mobile phone may include a display panel and a touch panel. The display panel may display an interface, and the touch panel may detect a user's touch operation and report the operation to a processor of the mobile phone for corresponding processing.

Figure 5:
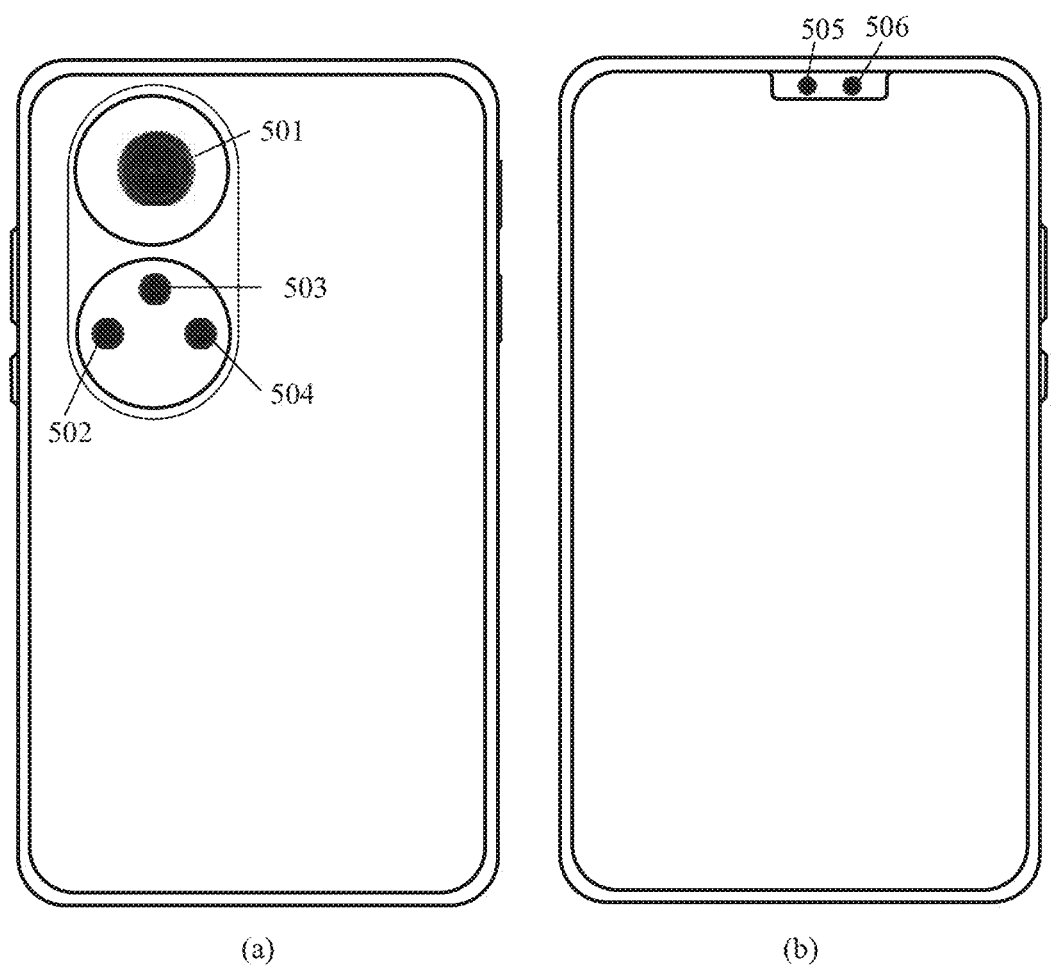
FIG. 5 is a schematic diagram of another electronic device according to an embodiment of this application.

The mobile phone provided in the embodiments of this application is provided with cameras with different focal lengths. Exemplarily, four cameras are arranged on the back of the mobile phone, and two cameras are arranged on the front of the mobile phone. The four cameras on the back of the mobile phone include a back primary camera, a macro camera, a wide-angle camera, and a depth camera. A positional relationship of the four cameras on the back of the mobile phones is shown in FIG. 5(a). A first rear camera 501 is the back primary camera, a second rear camera 502 is the macro camera, a third rear camera 503 is the wide-angle camera, and a fourth rear camera 504 is the depth camera. The two cameras on the front of the mobile phone include a front primary camera and a slave camera. A positional relationship of the two cameras on the front of the mobile phone is shown in FIG. 5(b). A first front camera 505 is the front primary camera and a second front camera 506 is the slave camera.

It should be noted that, w % ben the mobile phone generates an image with a large aperture blurring effect, the two cameras are in a working state. Specifically, the mobile phone uses the cameras on the back to generate an image, and the mobile phone may invoke any two of the four cameras on the back to be in the working state. For example, the back primary camera is used as a primary camera and the wide-angle camera is used as a secondary camera; or, the back primary camera is used as a primary camera and the depth camera is used as a secondary camera. In addition, the mobile phone may further use two front cameras to generate an image with a large aperture background blurring effect, the front primary camera may be used as the primary camera, and the slave camera may be used as the secondary camera; or, the slave camera is used as the primary camera, and the front primary camera is used as the secondary camera.

Exemplarily, a camera application (or another application having a function to enable a camera of the mobile phone) is installed in the mobile phone, and the camera application generates an image when run by the mobile phone. The mobile phone may be instructed to enable the camera application through a touch operation, a button operation, a gesture operation, or a voice operation. The mobile phone may run the camera application to display a preview image in real time. The mobile phone may generate a photo in various photographing modes, for example, a portrait mode, a large aperture mode, a slow motion mode, a panoramic mode, and the like. An image generated by the camera application in the large aperture mode has an effect of clear display for a target object and a blurred background.

When the mobile phone generates an image in the large aperture mode, two cameras of the mobile phone are in the working state. Because a focal length of each camera is different, and a field of view of each lens is different, if a distance between the two cameras is larger, difference between fields of view of images acquired by the two cameras is more obvious. It should be noted that, when generating an image in the large aperture mode, the mobile phone needs to generate an image having a background blurring effect based on two images acquired by the primary camera and the secondary camera respectively. In this case, the greater the difference between fields of view of the images acquired by the two cameras is, the more accurate a depth of field of a medium-range scene calculated by the mobile phone is. However, if the difference between the fields of view of the images acquired by the two cameras is greater, the mobile phone may be unable to determine a depth of field in a close-range scene when calculating the depth of field of the close-range scene because of a blind region of the depth of field, resulting in an error in calculation of the close-range scene by the mobile phone.

Based on this, when the mobile phone generates the image in the large aperture mode, the mobile phone may first determine a distance between a current target object and the mobile phone. In this way, the mobile phone may determine whether a current photographing scene is a close-range scene, a medium-range scene, or a long-range scene. The mobile phone determines the primary camera and the secondary camera to be used based on the current photographing scene, so that the mobile phone generates the image having the background blurring effect based on the images acquired by the primary camera and the secondary camera.

In some implementations, an image sensor included in the mobile phone may be a quadra sensor (Quadra Sensor, that is, an image sensor with a larger size). The quadra sensor may be connected to a camera to perform image processing on an image acquired by the camera, and the quadra sensor may output the image through binning or remosaic. In a process of generating an image in a large aperture mode, if the mobile phone receives a zoom operation inputted by a user, the quadra sensor may output an image with high clarity while ensuring generation of a background blurred image.

Exemplarily, in back cameras of the mobile phone, a specification of a back primary camera is 108M (108 million pixels), and the camera uses a 3×3 quadra sensor; a specification of a wide-angle camera (or super wide-angle camera) is 8M (8 million pixels); a specification of a depth camera is 2M (that is, a highest imaging resolution is 2 million pixels); and a specification of a macro camera is 2M (2 million pixels). Configuration of two cameras on the front of the mobile phone may be as follows: a specification of a front primary camera is 32M, and the camera uses a 2×2 quadra sensor; and a slave camera is the wide-angle camera whose specification is 12M.

As shown in FIG. 5(a), in four cameras on the back of the mobile phone, a distance between the back primary camera and the wide-angle camera is medium. Compared with the wide-angle camera, the depth camera and the macro camera are equidistantly distributed on both sides of the wide-angle camera. A distance between the depth camera and the back primary camera, and a distance between the macro camera and the back primary camera are long. The distance between the back primary camera and the depth camera is equal to the distance between the back primary camera and the macro camera. Therefore, the distance between the back primary camera and the depth camera (or the macro camera) may be called a long distance.

Figure 6A:
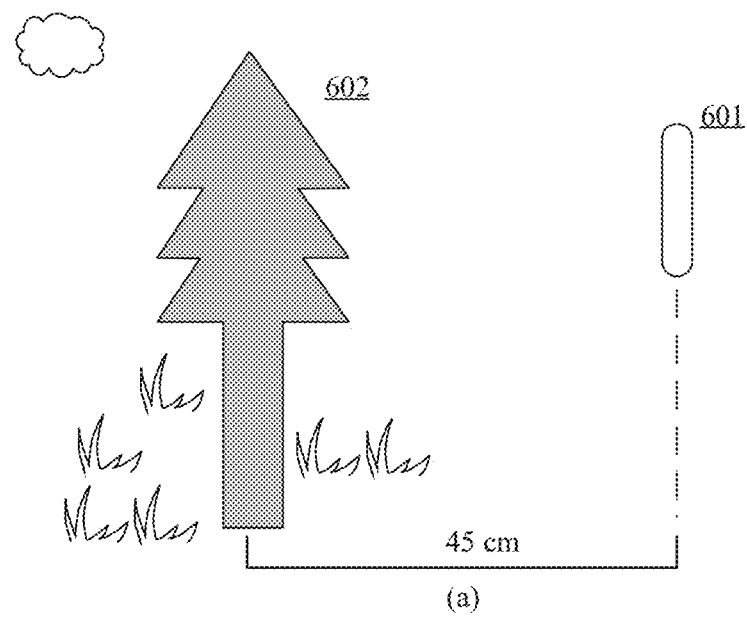
FIG. 6A is a schematic diagram of a photographing scene according to an embodiment of this application.
Figure 6A:
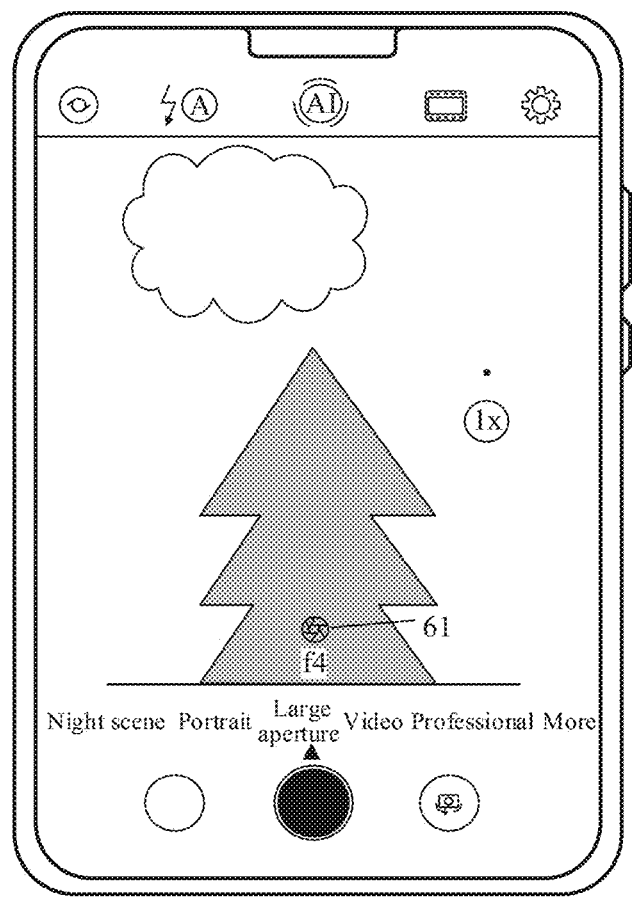

For example, a preset distance (or a first distance value) is 50 cm (cm). When a distance between the mobile phone and a photographed target object is within 50 cm (which may be understood as a close-range photographing scene), a combination of the back primary camera and the wide-angle camera may be used. As shown in FIG. 6A(a), a distance between a mobile phone 601 and a photographed target object 602 is 45 cm. FIG. 6A(b) is a schematic diagram of an image generated by the mobile phone. Specifically, the mobile phone runs a camera application and selects a large aperture mode to determine that a large aperture image is to be generated. When the mobile phone displays a photographing interface, 61 is an aperture mark, and FIG. 6A(b) shows that a current aperture size is f4 (a default aperture). As shown in FIG. 6A(b), in the photographing interface of the mobile phone, the current aperture size of the mobile phone is f4, and a zoom ratio is 1×. It may be understood that, when the mobile phone is in a large aperture photographing mode, the default aperture of the mobile phone is f4 and the zoom ratio is 1×. In other implementations, the mobile phone may further set the default aperture to f4 and the zoom ratio to 2×.

Specifically, the mobile phone obtains a distance value between the mobile phone and the target object. When the mobile phone determines that the distance value between the mobile phone and the target object (photographed object) is 45 cm, and it is determined as a close-range scene, the mobile phone may select a back primary camera as a primary camera and a wide-angle camera as a secondary camera. The back primary camera acquires a first image, and the wide-angle camera acquires a second image. The mobile phone calculates a depth of field based on the second image and determines an overlapping region between the two images based on the first image and the second image, and the overlapping region of the two images includes the photographed target object 602. The primary camera focuses on the target object 602, and the mobile phone makes the photographed target object clearly displayed and a background part blurred based on the overlapping region.

Figure 6B:
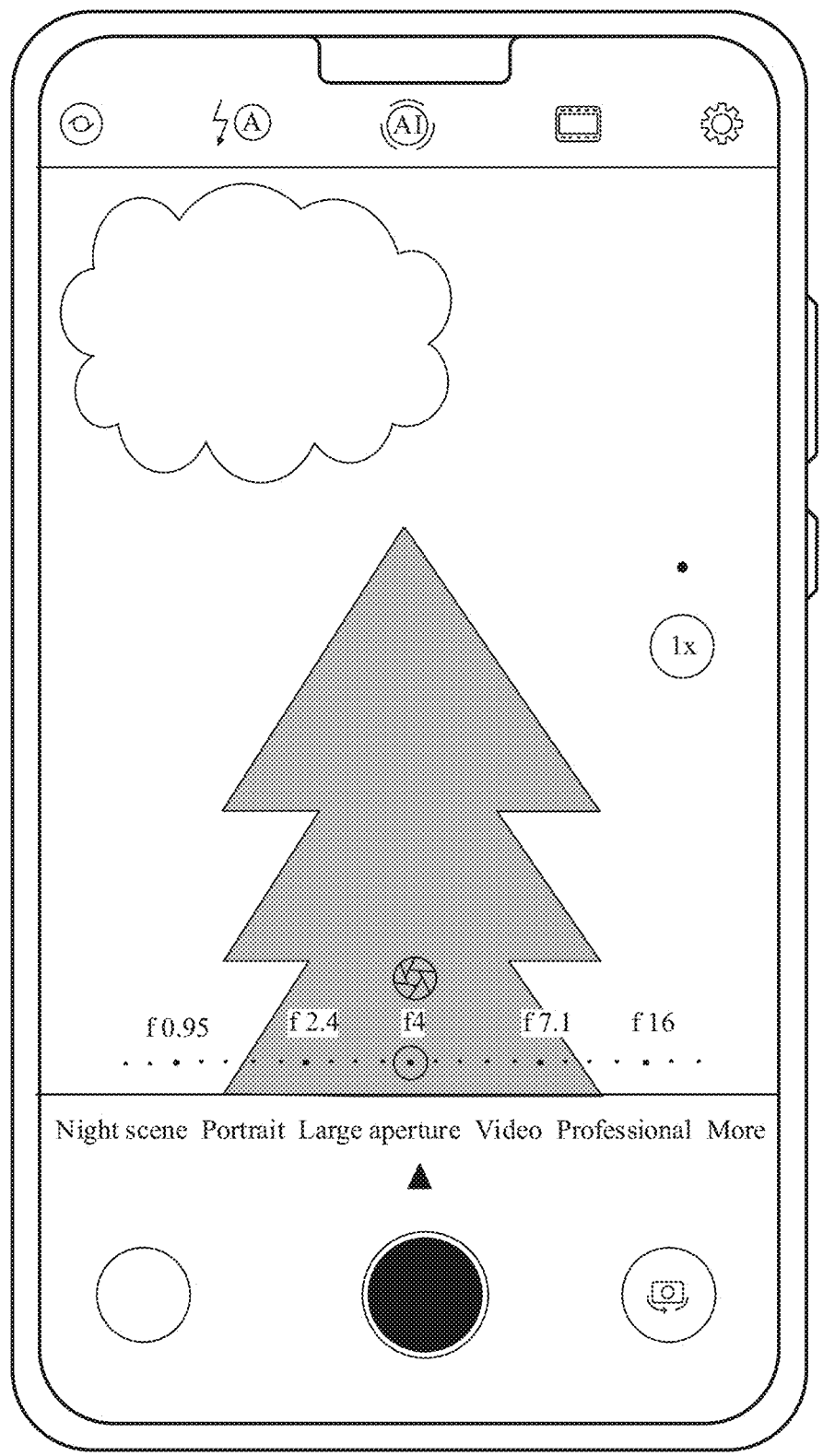
FIG. 6B is a schematic diagram of another photographing interface according to an embodiment of this application.

It may be understood that, when the mobile phone is in the large aperture mode, and the mobile phone is displaying a preview image of the large aperture mode, a user may view a large aperture image effect through a mobile phone display interface. If the user wants to adjust a display effect of a large aperture, for example, the user wants to adjust the aperture size, the user may click an aperture mark 61 in FIG. 6A(b). The mobile phone may display a photographing preview interface as shown in FIG. 6B in response to a click operation on the aperture mark 61 by the user. As shown in FIG. 6B, a photographing interface of the mobile phone includes an aperture adjustment axis, and the user may adjust an aperture size in a large aperture image displayed by the mobile phone by adjusting the aperture adjustment axis.

Figure 7:
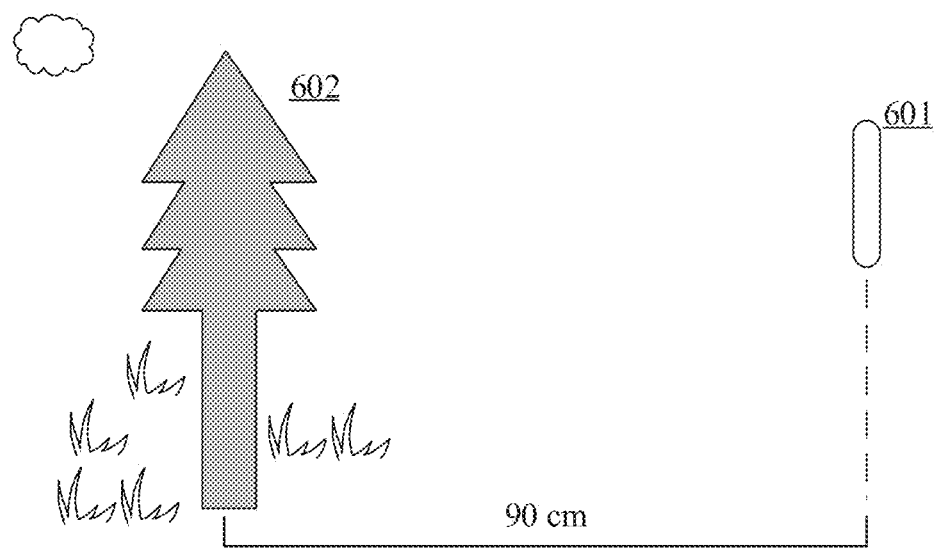
FIG. 7 is a schematic diagram of another photographing scene according to an embodiment of this application.

When the distance between the mobile phone and the photographed target object exceeds 50 cm (which may be understood as a long-distance photographing scene), a combination of the back primary camera and the depth camera, or a combination of the back primary camera and the macro camera may be used. Specifically. FIG. 7 is a schematic diagram of a photographing scene, and a distance between a mobile phone 601 and a photographed target object 602 is 90 cm. Specifically, the mobile phone runs a camera application and selects a large aperture mode to determine that an image is generated through a large aperture. The mobile phone first obtains a distance value between the mobile phone and the target object, and when the mobile phone determines that a distance between the mobile phone and the target object is 90 cm (greater than a preset distance value), it is determined that it is a long-range scene. A back primary camera is used as a primary camera, a depth camera is used as a secondary camera, the back primary camera acquires a first image, and the depth camera acquires a second image. The mobile phone may generate an image having a background blurring display effect based on the first image and the second image.

In some implementations, a close distance is within 50 cm. In this photographing scene, it is not easy to produce a blind region of a depth of field when the mobile phone acquires an image. If a distance between the back primary camera and a wide-angle camera is short, the mobile phone may use a combination of the back primary camera and the wide-angle camera, to avoid a phenomenon that the depth of field is not easy to be produced. A long distance is beyond 50 cm. In this photographing scene, a phenomenon that parallax between two cameras is obvious may appear when the mobile phone acquires the image. A distance between the back primary camera and the depth camera is the same as a distance between the back primary camera and a macro camera. In this photographing scene, distances of the back primary camera and the depth camera (or the macro camera) are equal, and the mobile phone uses a combination of the back primary camera and the depth camera (or the macro camera), to improve a problem of obvious parallax between the two cameras and calculate the depth of field accurately.

Based on this, the mobile phone selects the primary camera and the secondary camera in the mobile phone, and an image output method of a sensor of the primary camera based on different photographing scenes (that is, different distances from the target object). Detailed descriptions may be referred to correspondence in Table 1 below.

TABLE 1

Correspondence table between photographing scene and camera selection when mobile phone generates large aperture image

| Camera selection | Configuration information of primary camera + secondary camera | Distance between primary camera and secondary-camera | Effective pixel of primary camera | Effective pixel of secondary camera | Photographing scene | Image output method of primary camera |
|---|---|---|---|---|---|---|
| Back camera | Back primary camera + wide-angle camera | Medium | 9M | 3M | Within 50 cm | Binning |
| Back camera | Back primary camera + depth camera | Far | 9M | 2M | Beyond 50 cm | Binning |
| Back camera | Back primary camera + wide-angle camera | Medium | 9M | 3M | Within 50 cm | Remosaic |
| Back camera | Back primary camera + macro camera | Far | 9M | 2M | Beyond 50 cm, 3x zoom | Remosaic |
| Front camera | Front primary camera + slave camera | Medium | 8M | 7M | 2x zoom | Remosaic |
| Front camera | Slave camera + front primary camera | Medium | 7M | 8M | | Binning |

It should be noted that a method for the mobile phone to determine the photographing scene may be as follows: A camera of the mobile phone automatically focuses to generate an image, and the mobile phone determines the distance value between the mobile phone and the target object based on a focusing code of the camera. On the other hand, the mobile phone may further calculate the distance value between the mobile phone and the target object based on a sensor (such as a laser sensor). For example, when the mobile phone is in a photographing state and the mobile phone is in the large aperture mode, the sensor is enabled to calculate the distance value between the mobile phone and the target object.

It may be understood that, when a zoom ratio increases in a process of capturing an image by an electronic device, clarity of the image is affected. In photographing scenes with medium or low brightness, if a plurality of pixels may be merged into one pixel through binning, photosensitive performance of an image sensor may be improved and a signal-to-noise ratio is increased. In a high-brightness photographing scene, if one pixel is rearranged into an image in a bayer format through remosaic, the clarity of the image may be improved.

When the electronic device outputs an image through binning, the image sensor acquires a pixel image and transmits the pixel image to an ISP. The ISP may process the acquired pixel image through the binning, which is convenient for the ISP to perform post-algorithm processing on the image. For example, one pixel is rearranged into an image in the bayer format through the remosaic, and the image in the bayer format is also a pixel image. In another example, a plurality of pixels may be merged into one pixel through the binning, to obtain a pixel-processed image. An image in this format is also a kind of pixel image.

In a possible implementation, the back primary camera of the mobile phone processes the pixel image through the binning to generate a raw pixel image, and the mobile phone may further process the raw pixel image to generate a large aperture mode image including the target object.

In the foregoing example scene, the mobile phone determines that the photographing scene is within 50 cm, and the mobile phone uses the back primary camera as the primary camera and the wide-angle camera as the secondary camera. When the primary camera of the mobile phone outputs an image, the binning or the remosaic may be used.

In some implementations, if brightness of a current photographing scene of the mobile phone is less than a preset brightness threshold, the primary camera of the mobile phone outputs the image through the binning. If the mobile phone determines that the brightness of the current photographing scene is greater than the preset brightness threshold, the primary camera of the mobile phone may output the image through the remosaic. When the primary camera of the mobile phone outputs the image through the remosaic, pixels of the image are increased to improve clarity of the image. To output the image based on the remosaic, the mobile phone also needs to crop (crop) the outputted image, so that an image displayed by the mobile phone meet a requirement of image display.

In the foregoing description, if the mobile phone is in a zoom operation, a second image output method may still be used to ensure that the outputted image has a good display effect. Therefore, in other implementations, if the mobile phone is beyond 50 cm, in a scene without the zoom operation, the mobile phone may use the back primary camera as the primary camera and the depth camera as the secondary camera, and the mobile phone outputs the image through the binning. If the mobile phone is beyond 50 cm, and the mobile phone receives the zoom operation (for example, zoom is increased by 3 times "3× zoom"), the mobile phone may use the back primary camera as the primary camera and the macro camera as the secondary camera, and the mobile phone outputs the image through the remosaic, and crops (crop) the outputted image.

It may be understood that, when an image is generated in the large aperture mode, a user also needs to zoom and adjust an FOV. In this case, the mobile phone is in the large aperture mode, the mobile phone receives a zoom operation of the user, and the mobile phone may output the image through remosaic of the primary camera, which may improve an effective pixel of the primary camera and effectively improve clarity of a basic image under a large aperture. In addition, a non-bokeh region (that is, a clearly displayed region) is clearer, so that contrast between the non-bokeh region and a blurred background region is more obvious.

When the mobile phone generates an image under a large aperture, the mobile phone displays a preview image in real time. Before the mobile phone generates a large aperture image, the mobile phone may detect a current scene in real time, that is, the distance value between the mobile phone and the target object. It needs to be noted that, if the distance value between the mobile phone and the target object is close to 50 cm, in a process that the mobile phone displays the preview image, if the user carries the mobile phone to change a distance between the mobile phone and the target object, in this way, ping-pong handover between a close-range scene (within 50 cm) and a medium-long-range scene (beyond 50 cm) may be performed on a scene detected by the mobile phone, which makes ping-pong handover performed between the primary camera and secondary camera working in the mobile phone.

Based on this, the mobile phone may set a threshold protection range, for example, the threshold protection range is set to be between a third distance value and a second distance value. The third distance value is less than a first distance value (that is, a preset distance value), and the first distance value is less than the second distance value. Exemplarily, the threshold protection range may be between 60 cm and 45 cm. Specifically, when a current scene of the mobile phone is the close-range scene, that is, the distance between the mobile phone and the target object is within 50 cm, and when the mobile phone detects that the distance value between the target object and the mobile phone is 60 cm, the mobile phone determines that the current scene has changed, and then switches a working camera. For example, for a distance within 50 cm, the back primary camera on the mobile phone is used as the primary camera and the wide-angle camera on the mobile phone is used as the secondary camera. If the distance value between the mobile phone and the target object changes to 60 cm, the mobile phone switches the working camera. In this case, the mobile phone sets the back primary camera as the primary camera and the depth camera as the secondary camera. That is, in this case, the current photographing scene of the mobile phone is the medium-long-range scene. If the distance value between the mobile phone and the target object changes from 60 cm to 45 cm, the mobile phone may switch a currently working camera again, with the back primary camera of the mobile phone as the primary camera and the wide-angle camera of the mobile phone as the secondary camera.

In the foregoing example, when switching from a close-range photographing scene to a medium-long-range photographing scene, the distance value between the mobile phone and the target object is greater than a preset distance threshold (that is, 60 cm is greater than 50 cm). When switching from a medium-distance photographing scene to a close-range photographing scene, the distance value between the mobile phone and the target object is less than the preset distance value (that is, 45 cm is less than 50 cm).

Generally speaking, a lens in the mobile phone is composed of a plurality of lenses, so an effective focal length (Effective Focal Length, EFL) is often set to indicate a focal length of the lens in mobile phone.

In some implementations, when an automatic focus (Automatic Focus, AF) of the lens reaches 60 cm, a depth of field corresponding to an image generated by the mobile phone ranges from 53 cm to 70 cm. When the AF of the lens reaches 50 cm, the depth of field corresponding to the image generated by the mobile phone ranges from 45 cm to 56 cm. When the AF of the lens reaches 45 cm, the depth of field corresponding to the image generated by the mobile phone ranges from 41 cm to 50 cm. That is, in data around a preset distance of 50 cm, when the AFs of the lens in the mobile phone are 45 cm and 60 cm, ranges of the depths of field of the images generated by the mobile phone do not overlap. Based on this, the mobile phone may set an interval between 60 cm and 45 cm as the threshold protection range.

Figure 8A:
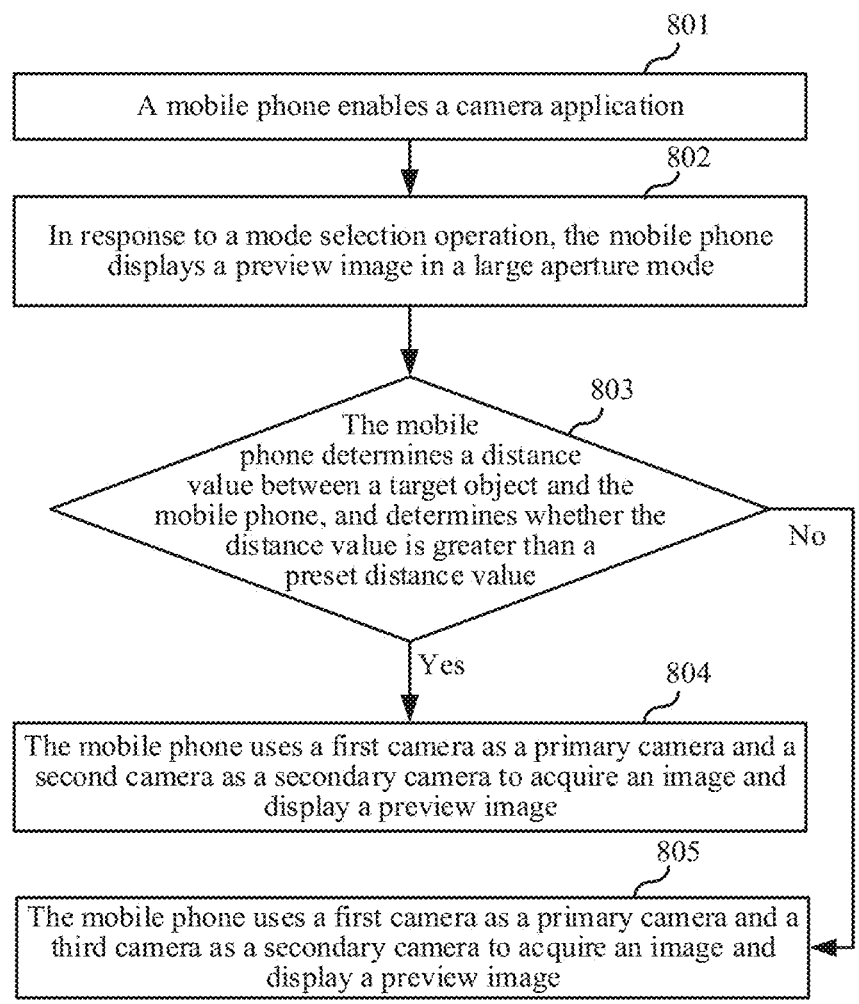
FIG. 8A is a flowchart of a photographing method according to an embodiment of this application.

The embodiments of this application further provide a photographing method, and an example in which the method is applied to a mobile phone is used. An implementation flow of the method is shown in FIG. 8A, and the method may include step 801 to step 805.

Step 801. A mobile phone enables a camera application.

Step 802. In response to a mode selection operation, the mobile phone displays a preview image in a large aperture mode.

The mobile phone may generate an image with a bokeh effect in the large aperture mode. Specifically, the preview image displayed by the mobile phone and an image generated in response to a photographing button are both images with the bokeh effect.

In addition, a "portrait" part of an image generated by the mobile phone in a "portrait mode" is clear, and a portrait background part is blurred. That is, the "portrait mode" in the camera application is also a large aperture mode mentioned in the embodiments of this application.

Step 803. The mobile phone determines a distance value between a target object and the mobile phone, and determines whether the distance value is greater than a preset distance value. If the distance value is greater than the preset distance value, step 804 is performed; or if the distance value is less than or equal to the preset distance value, step 805 is performed.

Because there are a plurality of cameras in the mobile phone, distances between cameras affect parallax of an acquired image because of different FOV of cameras. A used camera is adjusted based on a distance value between the mobile phone and the camera, to improve quality of an image generated by the mobile phone.

Step 804. The mobile phone uses a first camera as a primary camera and a second camera as a secondary camera to acquire an image and display a preview image.

Step 805. The mobile phone uses a first camera as a primary camera and a third camera as a secondary camera to acquire an image and display a preview image.

A distance value between the first camera and the second camera is greater than a distance value between the first camera and the third camera.

Figure 8B:
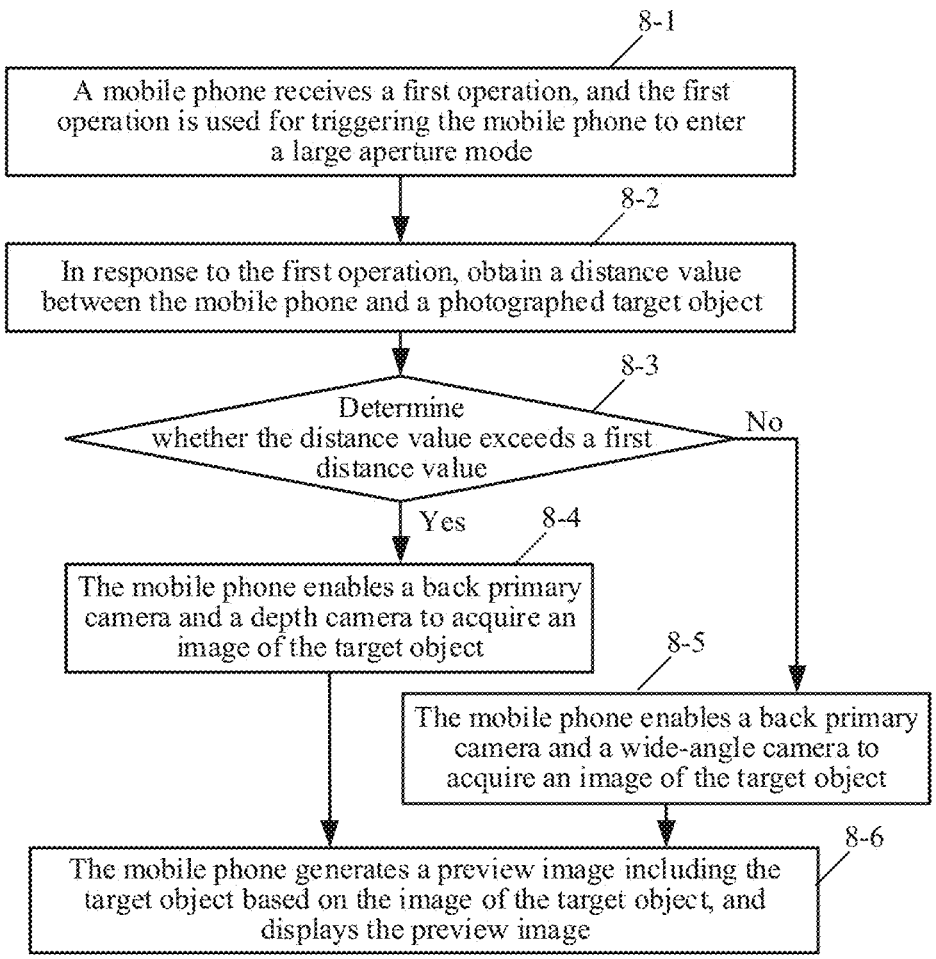
FIG. 8B is a flowchart of another photographing method according to an embodiment of this application.

The embodiments of this application further provide a photographing method, and an example in which the photographing method is implemented by a mobile phone is used. As shown in FIG. 8B, the method includes step 8-1 to step 8-6.

Step 8-1. A mobile phone receives a first operation, and the first operation is used for triggering the mobile phone to enter a large aperture mode.

In some implementations, the mobile phone runs a camera application, and the mobile phone displays a photographing preview interface. The photographing preview interface of the mobile phone includes a plurality of photographing modes, and the photographing modes include the large aperture mode. The first operation is a click operation on the "large aperture mode" in the photographing mode performed by a user, to make the mobile phone enter the large aperture mode.

In other implementations, the mobile phone is running a first application (the first application is a non-camera application), and the first application has an authority to enable a camera. In response to an operation of invoking the camera, the first application invokes the camera, and the mobile phone displays a photographing interface corresponding to the camera. The photographing interface includes a plurality of photographing modes provided by the mobile phone, and the photographing modes include the large aperture mode. The first operation is a click operation on the "large aperture mode" in the photographing mode performed by a user, to make the mobile phone enter the large aperture mode.

Step 8-2. In response to the first operation, obtain a distance value between the mobile phone and a photographed target object.

Generally, a plurality of cameras are installed in the mobile phone. In a process that the mobile phone captures an image in the large aperture mode, the distance value between the mobile phone and the photographed target object is different, and cameras enabled by the mobile phone are also different. Therefore, before the mobile phone displays a preview image with a large aperture, the mobile phone obtains the distance value between the mobile phone and the photographed target object in response to the first operation.

In some implementations, the mobile phone includes a laser sensor, and the mobile phone may obtain the distance value between the mobile phone and the target object through the laser sensor. In other implementations, a primary camera in the mobile phone is enabled, and the mobile phone obtains an image acquired by the primary camera. Based on focus in the image acquired by the primary camera, the mobile phone may calculate the distance value between the mobile phone and the target object based on the image acquired by the primary camera.

Step 8-3. Determine whether the distance value exceeds a first distance value. If the distance value exceeds the first distance value, step 8-4 is performed; or if the distance value does not exceed the first distance value, step 8-5 is performed.

A photographing distance is related to the camera enabled by the mobile phone, a specific correspondence and implementation details have been described, and this is not repeated herein again.

It should be noted that, in the embodiments of this application. "exceed" may mean that the distance value is greater than the first distance value, or that the distance value is greater than or equal to the first distance value. For example, if the distance value is greater than the first distance value, the mobile phone performs step 8-4; or if the distance value is less than or equal to the first distance value, the mobile phone performs step 8-5. In another example, if the distance value is greater than or equal to the first distance value, the mobile phone performs step 8-4; or if the distance value is less than the first distance value, the mobile phone performs step 8-5.

Step 8-4. The mobile phone enables a back primary camera and a depth camera to acquire an image of the target object.

Step 8-5. The mobile phone enables a back primary camera and a wide-angle camera to acquire an image of the target object.

Step 8-6. The mobile phone generates a preview image including the target object based on the image of the target object, and displays the preview image.

The preview image is a preview image corresponding to the large aperture mode.

It needs to be noted that, when the mobile phone displays the preview image corresponding to the large aperture mode, an image of a target object in the preview image is a clear display part of the image, and a non-target object is a blurred display part of the image. As shown in FIG. 3B, the target object is clearly displayed in an aperture 301, and a region outside the aperture 301 is a blurred display region. If a user wants to adjust the photographed target object, the user may adjust a photographing angle of the mobile phone. Exemplarily, the user clicks a certain region in the preview image, and the mobile phone adjusts the target object to an image of a thing in a clicked region in response to a click operation of the user. In this way, the mobile phone needs to recalculate the distance value between the mobile phone and the photographed target object, and adjust a currently enabled camera.

In some implementations, when the mobile phone determines that the target object changes, the mobile phone detects a current distance value between the mobile phone and the target object, to adjust the enabled camera based on the current distance value. During photographing, frequent switching of cameras may make an image displayed by the mobile phone flicker. To ensure normal and stable operation of the large aperture mode in the mobile phone, a threshold protection range may be set in the mobile phone. Setting of the threshold protection range in the mobile phone has been described in detail in the foregoing scene switching, and this is not repeated herein again.

The method provided in the embodiments of this application is described by using an example in which the electronic device is a mobile phone, and the method may also be used when the electronic device is another device. Details are not repeated herein again.

It may be understood that, to implement the foregoing functions, the electronic device in the embodiments of this application includes corresponding hardware structures and/or software modules for performing the functions. A person skilled in the art should be easily aware that, in combination with examples of units and algorithm steps described in the embodiments disclosed in this specification, the embodiments of this application can be implemented in a form of hardware or a form of a combination of hardware and computer software. Whether a function is performed by hardware or computer software driving hardware depends on particular applications and design constraints of the technical solutions. A person skilled in the art may use different methods to implement the described functions for each particular application, but it should not be considered that, the implementation goes beyond the scope of the embodiments of this application.

In the embodiments of this application, function modules of the electronic device may be divided based on the foregoing method example. For example, each function module may be divided according to each function, or two or more functions may be integrated into one processing module. The integrated module is implemented in the form of hardware, or is implemented in the form of a software functional module. It needs to be noted that, in this embodiment of this application, the module division is an example, and is merely logical function division, and there may be other division manners during actual application.

Figure 9:
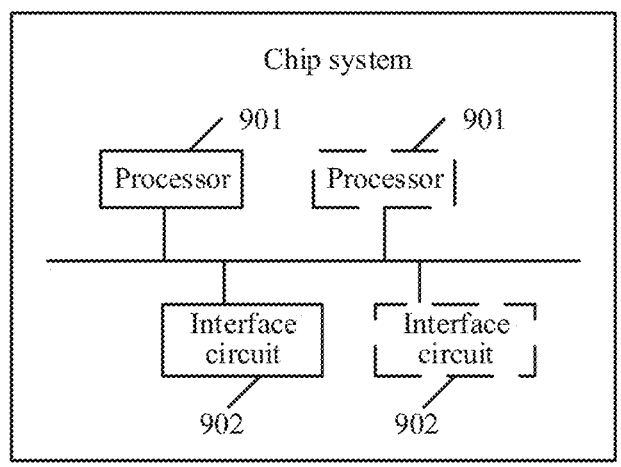
FIG. 9 is a schematic structural diagram of a chip system according to an embodiment of this application.

An embodiment of this application further provides a chip system. As shown in FIG. 9, the chip system includes at least one processor 901 and at least one interface circuit 902. The processor 901 and the interface circuit 902 may be interconnected by lines. For example, the interface circuit 902 may be configured to receive a signal from another apparatus (such as a memory of the electronic device). In another example, the interface circuit 902 may be configured to send a signal to another apparatus (for example, the processor 901). For example, the interface circuit 902 may read instructions stored in the memory and send the instructions to the processor 901. The instructions, when executed by the processor 901, may cause the electronic device to perform the steps in the foregoing embodiments. Certainly, the chip system may further include other discrete devices. This is not specifically limited in this embodiment of this application.

An embodiment of this application further provides a computer storage medium, including computer instructions, the computer instructions, when run on the foregoing electronic device, causing the electronic device to perform the functions or the steps performed by the mobile phone in the foregoing method embodiments.

An embodiment of this application further provides a computer program product, the computer program product, when run on a computer, causing the computer to perform the functions or the steps performed by the mobile phone in the foregoing method embodiments.

The foregoing description about implementations allows a person skilled in the art to understand that, for the purpose of convenient and brief description, division of the foregoing functional modules is taken as an example for illustration. In actual application, the foregoing functions can be allocated to different functional modules and implemented according to a requirement, that is, an internal structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be indirect coupling or communication connection through some interfaces, apparatuses or units, and may be electrical, mechanical or in other forms.

The units described as separate components may or may not be physically separate, and components displayed as units may be one or more physical units, may be located in one place, or may be distributed on different places. Some or all of the units may be selected according to actual needs to achieve the objectives of the solutions of the embodiments hereof.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory. RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A photographing method, applied to an electronic device, wherein the electronic device comprises a first camera, a second camera, and a third camera, the method comprising:
receiving, by the electronic device, a first operation for triggering the electronic device to enter a large aperture mode;
obtaining, by the electronic device, a distance value between the electronic device and a photographed target object in response to the first operation;
enabling, by the electronic device in a case that the distance value does not exceed a first distance threshold, the first camera and the second camera to acquire an image of the target object;
enabling, by the electronic device in a case that the distance value exceeds the first distance threshold, the first camera and the third camera to acquire an image of the target object; and
displaying, by the electronic device, a preview image comprising the target object, wherein the preview image is a preview image corresponding to the large aperture mode.

2. The photographing method of claim 1, wherein before receiving the first operation, the method further comprises enabling, by the electronic device, the first camera to acquire the image of the target object, and wherein obtaining the distance value between the electronic device and a photographed target object comprises:
obtaining, by the electronic device, an autofocus code of the first camera, wherein the autofocus code indicates a distance value between the first camera and the target object; and using the autofocus code as the distance value between the electronic device and the target object.

3. The photographing method of claim 1, wherein the electronic device further comprises a distance sensor, and wherein obtaining the distance value between the electronic device and a photographed target object comprises enabling, by the electronic device, the distance sensor to determine the distance value between the electronic device and the target object.

4. The photographing method of claim 1, wherein a zoom ratio of the electronic device is a first ratio, and wherein displaying the preview image comprising the target object comprises outputting, by the electronic device, a raw pixel image through binning to generate an image of the target object and display the preview image comprising the target object.

5. The photographing method of claim 4, wherein binning comprises obtaining, by the electronic device, a pixel image of the target object, and performing a simulated merging operation on pixel information in the pixel image, to output the image comprising the target object, and wherein remosaic comprises obtaining, by the electronic device, the pixel image of the target object, and rearranging pixels in the pixel image, to output the image comprising the target object.

6. The photographing method of claim 1, wherein a zoom ratio of the electronic device is a first ratio, and wherein after enabling the first camera and the second camera to acquire the image of the target object in the case that the distance value does not exceed the first distance threshold, displaying the preview image comprising the target object comprises outputting, by the electronic device, a raw pixel image through binning to generate an image of the target object and display the preview image comprising the target object.

7. The photographing method of claim 6, wherein after displaying the preview image comprising the target object, the method further comprises:
   receiving, by the electronic device, a second operation that instructs the electronic device to adjust the zoom ratio to a second ratio, wherein the second ratio is greater than the first ratio; and
   outputting, by the electronic device, a raw pixel image through remosaic in response to the second operation to generate an image of the target object and display the preview image comprising the target object.

8. The photographing method of claim 7, wherein the first camera, the second camera, and the third camera are all back cameras of the electronic device, and wherein the first camera is a back primary camera, the second camera is a wide-angle camera, and the third camera is a telephoto or depth camera.

9. The photographing method of claim 7, wherein generating the image of the target object through remosaic and displaying the preview image comprising the target object comprises:
   outputting, by the electronic device, a raw image through remosaic;
   cropping, by the electronic device, the raw image to generate the image of the target object; and
   displaying, by the electronic device, the preview image comprising the target object.

10. The photographing method of claim 1, wherein the first camera, the second camera, and the third camera are arranged on a first surface of the electronic device, and wherein a distance value between the first camera and the second camera is less than a distance value between the first camera and the third camera.

11. The photographing method of claim 1, wherein the first camera, the second camera, and the third camera are arranged on a first surface of the electronic device, and when the electronic device obtains an image, the cameras arranged on the first surface are enabled, wherein the electronic device further comprises a fourth camera and a fifth camera arranged on a second surface of the electronic device, and wherein after receiving the first operation, the method further comprises:
   receiving, by the electronic device for triggering the electronic device to enable the cameras arranged on the second surface;
   enabling, by the electronic device, the fourth camera and the fifth camera in response to the third operation to acquire an image of the target object, wherein the fourth camera serves as a primary camera, the fifth camera serves as a secondary camera, the primary camera is configured to focus on the target object, and the secondary camera is configured to calculate a depth of field;
   displaying, by the electronic device, a first preview image comprising the target object, wherein the first preview image is a preview image corresponding to the large aperture mode, and a zoom ratio corresponding to the first preview image is a first ratio;
   receiving, by the electronic device, a second operation that instructs the electronic device to adjust the zoom ratio to a second ratio, wherein the second ratio is greater than the first ratio;
   adjusting, by the electronic device, the fifth camera as the primary camera, and the sixth fourth camera as the secondary camera in response to the second operation; and
   displaying, by the electronic device, a second preview image comprising the target object, wherein the second preview image is a preview image corresponding to the large aperture mode, and a zoom ratio corresponding to the second preview image is a second ratio.

12. The photographing method of claim 11, wherein enabling the fourth camera and the fifth camera in response to the third operation to acquire the image of the target object further comprises outputting, by the electronic device, a raw pixel image through binning to generate an image of the target object and display the image comprising the target object, and wherein displaying the second preview image comprises outputting, by the electronic device, a raw pixel image through remosaic to generate an image of the target object and display the second preview image comprising the target object.

13. The photographing method of claim 11, wherein the first preview image corresponding to the large aperture mode comprises a blurred display part and a clear display part, and wherein enabling the fourth camera and the fifth camera in response to the third operation to acquire the image of the target object comprises:
   acquiring, by the primary camera, a first image, and acquiring, by the secondary camera, a second image;
   outputting, by the primary camera, a raw pixel image through binning, and obtaining the first image based on the raw pixel image;
   determining, by the electronic device, a target object based on the raw pixel image, to determine the target object as the clear display part;
   calculating, by the electronic device, a depth of field based on the second image, and determining the blurred display part; and generating, by the electronic device, the first preview image of the target object based on the first image and the second image,
wherein adjusting the fifth camera as the primary camera, and the fourth camera as the secondary camera in response to the second operation comprises:
acquiring, by the primary camera, a first image, and acquiring, by the secondary camera, a second image;
outputting, by the primary camera, the raw pixel image through remosaic, and cropping the raw pixel image to obtain the first image;
determining, by the electronic device, a target object based on the raw pixel image, to determine the target object as the clear display part;
calculating, by the electronic device, a depth of field based on the second image, and determining the blurred display part; and
generating, by the electronic device, the first preview image of the target object based on the first image and the second image.

14. The photographing method of claim 1, wherein the preview image is a preview image of the target object acquired in the case that the distance value does not exceed a first distance value, and wherein the method further comprises:
obtaining, by the electronic device, a current distance value between the electronic device and the target object; and
enabling, by the electronic device in a case that the current distance value exceeds a second distance threshold, the first camera and the third camera to acquire the image of the target object, wherein the second distance threshold is greater than the first distance threshold.

15. The photographing method of claim 1, wherein the preview image is a preview image of the target object acquired in the case that the distance value exceeds the first distance threshold, and wherein the method further comprises:
obtaining, by the electronic device, a current distance value between the electronic device and the target object; and
enabling, by the electronic device in a case that the current distance value does not exceed a third distance threshold, the first camera and the second camera to acquire the image of the target object, wherein the third distance threshold is less than the first distance threshold.

16. The photographing method of claim 1, wherein the preview image corresponding to the large aperture mode comprises a blurred display part and a clear display part, wherein the preview image is a preview image of the target object acquired in the case that the distance value does not exceed the first distance threshold in which the first camera serves as a primary camera and the second camera serves as a secondary camera, and wherein displaying the preview image comprising the target object comprises:
acquiring, by the primary camera, a first image, and acquiring, by the secondary camera, a second image;
determining, by the electronic device, a target object based on the first image, and determining the target object as the clear display part;
calculating, by the electronic device, a depth of field based on the second image, and determining the blurred display part; and
generating, by the electronic device, the preview image corresponding to the large aperture mode based on the first image and the second image, and displaying the preview image.

17. The photographing method of claim 1, wherein the preview image corresponding to the large aperture mode comprises a blurred display part and a clear display part, wherein the preview image is a preview image of the target object acquired in the case that the distance value exceeds the first distance threshold in which the first camera serves as a primary camera and the third camera serves as a secondary camera, and wherein displaying the preview image comprising the target object comprises:
acquiring, by the primary camera, a first image, and acquiring, by the secondary camera, a second image;
outputting, by the primary camera, a raw pixel image through binning, and obtaining the first image based on the raw pixel image;
determining, by the electronic device, a target object based on the raw pixel image, to determine the target object as the clear display part;
calculating, by the electronic device, a depth of field based on the second image, and determining the blurred display part; and
generating, by the electronic device, the preview image corresponding to the large aperture mode based on the first image and the second image, and displaying the preview image.

18. An electronic device, comprising:
a processor;
a first camera coupled to the processor;
a second camera coupled to the processor;
a third camera coupled to the processor;
a touchscreen coupled to the processor, wherein the touchscreen is configured to detect a touch operation and display an interface; and
a memory coupled to the processor, wherein the memory stores instructions that, when executed by the processor, cause the electronic device to be configured to:
receive a first operation for triggering the electronic device to enter a large aperture mode;
obtain a distance value between the electronic device and a photographed target object in response to the first operation;
enable, in a case that the distance value does not exceed a first distance threshold, the first camera and the second camera to acquire an image of the target object;
enable, by the electronic device in a case that the distance value exceeds the first distance threshold, the first camera and the third camera to acquire an image of the target object; and
display, on the touchscreen, a preview image comprising the target object, wherein the preview image is a preview image corresponding to the large aperture mode.

19. The electronic device of claim 18, wherein the first camera, the second camera, and the third camera are arranged on a first surface of the electronic device, and wherein a distance value between the first camera and the second camera is less than a distance value between the first camera and the third camera.

20. A non-transitory computer-readable storage medium, comprising instructions that, when executed by a processor of an electronic device, cause the electronic device to be configured to:
receive a first operation for triggering the electronic device to enter a large aperture mode;
obtain a distance value between the electronic device and a photographed target object in response to the first operation;

enable, in a case that the distance value does not exceed a first distance threshold, first and second cameras of the electronic device to acquire an image of the target object;

enable, by the electronic device in a case that the distance value exceeds the first distance threshold, the first camera and a third camera of the electronic device to acquire an image of the target object; and display a preview image comprising the target object, wherein the preview image is a preview image corresponding to the large aperture mode.

* * * * *

UNITED STATES PATENT AND TRADEMARK OFFICE
CERTIFICATE OF CORRECTION

PATENT NO. : 12,170,844 B2
APPLICATION NO. : 18/043373
DATED : December 17, 2024
INVENTOR(S) : Hantao Cui et al.

It is certified that error appears in the above-identified patent and that said Letters Patent is hereby corrected as shown below:

In the Claims

Claim 11, Column 32, Line 10: "electronic device for triggering the" should read "electronic device, a third operation for triggering the"

Claim 11, Column 32, Line 32: "and the sixth fourth camera" should read "and the fourth camera"

Signed and Sealed this
Eleventh Day of February, 2025

Coke Morgan Stewart
*Acting Director of the United States Patent and Trademark Office*